United States Patent
Kim et al.

(10) Patent No.: US 9,887,824 B2
(45) Date of Patent: Feb. 6, 2018

(54) METHOD AND APPARATUS FOR REPORTING CHANNEL STATE INFORMATION FOR SUPPORTING 256QAM IN WIRELESS ACCESS SYSTEM

(71) Applicant: LG ELECTRONICS INC., Seoul (KR)

(72) Inventors: Bonghoe Kim, Seoul (KR); Yunjung Yi, Seoul (KR)

(73) Assignee: LG Electronics Inc., Seoul (KR)

( * ) Notice: Subject to any disclaimer, the term of this patent is extended or adjusted under 35 U.S.C. 154(b) by 0 days.

(21) Appl. No.: 15/129,621

(22) PCT Filed: Mar. 27, 2015

(86) PCT No.: PCT/KR2015/003044
§ 371 (c)(1),
(2) Date: Sep. 27, 2016

(87) PCT Pub. No.: WO2015/147592
PCT Pub. Date: Oct. 1, 2015

(65) Prior Publication Data
US 2017/0180099 A1    Jun. 22, 2017

Related U.S. Application Data

(60) Provisional application No. 61/971,549, filed on Mar. 28, 2014.

(51) Int. Cl.
*H04L 5/00* (2006.01)
*H04L 1/00* (2006.01)
(Continued)

(52) U.S. Cl.
CPC .......... *H04L 5/0057* (2013.01); *H04B 7/0626* (2013.01); *H04B 7/0632* (2013.01);
(Continued)

(58) Field of Classification Search
CPC .... H04B 7/0626; H04B 7/0632; H04W 24/08
(Continued)

(56) References Cited

U.S. PATENT DOCUMENTS

2013/0322376 A1  12/2013  Marinier et al.
2014/0086174 A1*  3/2014  Nam ............... H04L 1/0003
                                                      370/329

FOREIGN PATENT DOCUMENTS

JP        2012-222430 A    11/2012

OTHER PUBLICATIONS

Huawei, HiSilicon, Further Discussions on CQI/MCS table design for 256QAM, Retrieved on Mar. 22, 2014, 3GPP TSG WG1 Meeting #76bis, R1-141120, Retrieved from http://www.3gpp.org/ftp/tsg_ran/wg1_rl1/tsgr1_76b/docs/.*
(Continued)

*Primary Examiner* — Raj Chakraborty
(74) *Attorney, Agent, or Firm* — Dentons US LLP

(57) ABSTRACT

The present invention relates to a wireless access system, more particularly, to methods for transceiving channel state information (CSI) for supporting 256 quadrature amplitude modulation (QAM) scheme and apparatuses for supporting the methods. A method by which a terminal capable of supporting 256 QAM in a wireless access system reports CSI, according to one embodiment of the present invention, comprises the steps of: receiving a higher-layer signal for configuring a first rank indicator (RI) reference process in the terminal; measuring a channel quality for one or more CSI processes associated with the first RI reference process configured in the terminal; selecting a channel quality indication (CQI) index by using only a first CQI table or a second CQI table for the one or more CSI processes; and reporting the CSI including the CQI index. Here, the first CQI table can support up to 64 QAM and the second CQI (Continued)

table can support up to 256 QAM, and only the same CQI table can be applied to the one or more CSI processes associated with the first RI reference process.

20 Claims, 19 Drawing Sheets

(51) Int. Cl.
H04L 27/34 (2006.01)
H04W 24/08 (2009.01)
H04B 7/06 (2006.01)
(52) U.S. Cl.
CPC .......... *H04L 1/0003* (2013.01); *H04L 1/0007* (2013.01); *H04L 1/0015* (2013.01); *H04L 1/0026* (2013.01); *H04L 5/0055* (2013.01); *H04L 27/34* (2013.01); *H04W 24/08* (2013.01)
(58) Field of Classification Search
USPC .......................................................... 455/69
See application file for complete search history.

(56) References Cited

OTHER PUBLICATIONS

Alcatel-Lucent Shanghai Bell, Alcatel-Lucent: "Specification of 256 QAM", 3GPP TSG RAN WG1 Meeting #76, R1-140160, Feb. 10-14, 2014.
LG Electronics: "Further details on 256QAM operation", 3GPP TSG RAN WG1 Meeting #76bis, R1-141338, Mar. 31-Apr. 4, 2014.
Hitachi Ltd.: "Discussion on Mechanism to Support 256QAM in TM 10", 3GPP TSG-RAN WG1 #76bis, R1-141393, Mar. 31-Apr. 4, 2014.
Huawei, HiSilicon: "Further discussions on CQI/MCS table design for 256QAM", 3GPP TSG RAN WG1 Meeting #76bis, R1-141120, Mar. 31-Apr. 4, 2014.
ZTE: "On standard impacts of 256QAM in downlink", R1-140258, 3GPP TSG RAN WG1 Meeting #76, Prague, Czech Republic, Feb. 10-14, 2014.

\* cited by examiner

FIG. 4
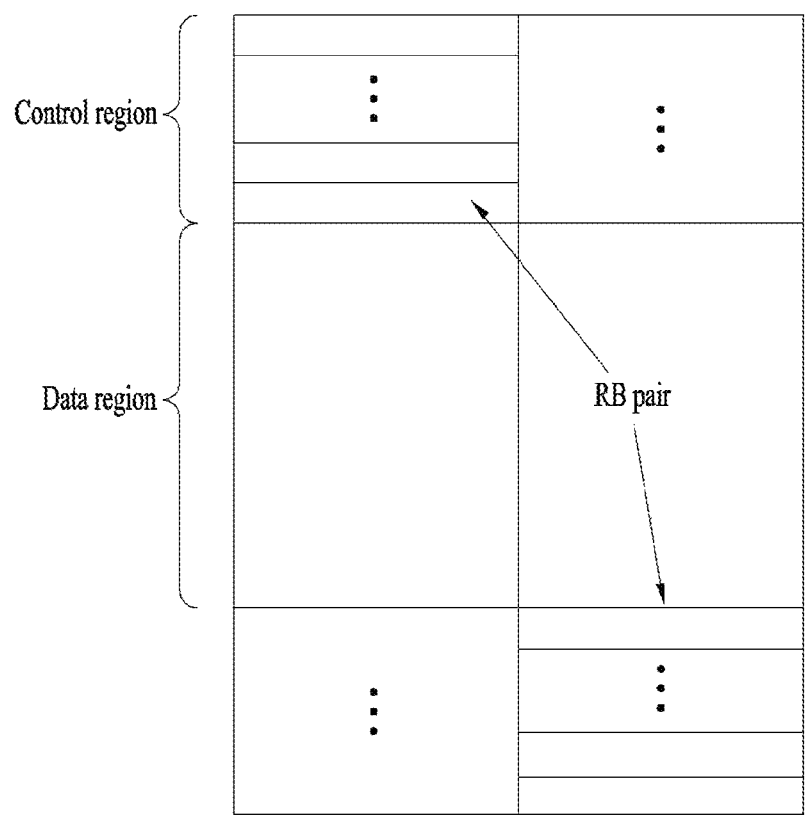
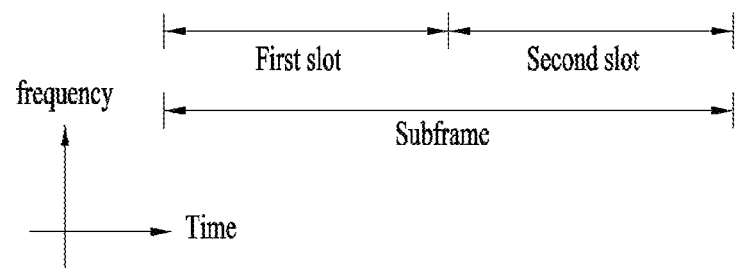

PUCCH format 1a and 1b structure (Normal CP case)

PUCCH format 1a and 1b structure (Extended CP case)

PUCCH format 2,2a and 2b structure (Normal CP case)

PUCCH format 2,2a and 2b structure (Extended CP case)

FIG. 10

Resource allocation: 18 ACK/NACK channels with normal CP $\Delta_{shift}^{PUCCH} = 2$

| Cell specific cyclic shift offset | | RS orthogonal cover | | | ACK/NACK orthogonal cover | | |
|---|---|---|---|---|---|---|---|
| $\delta_{offset}^{PUCCH} = 1$ | $\delta_{offset}^{PUCCH} = 0$ | $\bar{n}_{OC} = 0$ | $\bar{n}_{OC} = 1$ | $\bar{n}_{OC} = 2$ | $n_{OC} = 0$ | $n_{OC} = 1$ | $n_{OC} = 2$ |
| $n_{CS} = 1$ | $n_{CS} = 0$ | $n' = 0$ | | 12 | $n' = 0$ | | 12 |
| 2 | 1 | | 6 | 13 | | 6 | 13 |
| 3 | 2 | 1 | | | 1 | | |
| 4 | 3 | | 7 | 14 | | 7 | 14 |
| 5 | 4 | 2 | | | 2 | | |
| 6 | 5 | | 8 | 15 | | 8 | 15 |
| 7 | 6 | 3 | | | 3 | | |
| 8 | 7 | | 9 | 16 | | 9 | 16 |
| 9 | 8 | 4 | | | 4 | | |
| 10 | 9 | | 10 | 17 | | 10 | 17 |
| 11 | 10 | 5 | | | 5 | | |
| 0 | 11 | | 11 | | | 11 | |

$\Delta_{shift}^{PUCCH} \in \{1,2,3\}$ for normal cyclic prefix
$\{1,2,3\}$ for extended cyclic prefix Cell-specific Cyclic shift value of CAZAC sequence $\delta_{offset}^{PUCCH} \in \{0,1,...,\Delta_{shift}^{PUCCH} - 1\}$ Cell specific cyclic shift offset $n_{OC}$  Orthogonal sequence index for ACK/NACK
$\bar{n}_{OC}$  Orthogonal sequence index for RS
$n_{CS}$  Cyclic shift value of a CAZAC sequence
$n'$  ACK/NACK resource index used for the channelization in a RB

METHOD AND APPARATUS FOR REPORTING CHANNEL STATE INFORMATION FOR SUPPORTING 256QAM IN WIRELESS ACCESS SYSTEM

This is application is a National Stage Entry of International Application No. PCT/KR2015/003044 filed Mar. 27, 2015, which claims priority to U.S. Provisional Application No. 61/971,549 filed Mar. 28, 2014, each of which are incorporated by reference for all purposes as if fully set forth herein.

TECHNICAL FIELD

The present invention relates to a wireless access system, and more particularly, to methods for transmitting and receiving Channel State information (CSI) to support 256-ary Quadrature Amplitude Modulation (256 QAM) and apparatuses supporting the methods.

BACKGROUND ART

Wireless access systems have been widely deployed to provide various types of communication services such as voice or data. In general, a wireless access system is a multiple access system that supports communication of multiple users by sharing available system resources (a bandwidth, transmission power, etc.) among them. For example, multiple access systems include a Code Division Multiple Access (CDMA) system, a Frequency Division Multiple Access (FDMA) system, a Time Division Multiple Access (TDMA) system, an Orthogonal Frequency Division Multiple Access (OFDMA) system, and a Single Carrier Frequency Division Multiple Access (SC-FDMA) system.

DISCLOSURE

Technical Problem

In the current Long Term Evolution (LTE)/LTE-Advanced (LTE-A) system, only Quadrature Phase Shift Keying (QPSK), 16-ary Quadrature Amplitude Modulation (16 QAM), and 64-ary Quadrature Amplitude Modulation (64 QAM) are adopted as modulation schemes. However, use of 256 QAM is under discussion in order to transmit more data and efficiently use radio resources. To support 256 QAM, a new transport block size and new Modulation and Coding Scheme (MCS) signaling need to be defined. In addition, a new CSI feedback method suitable for 256 QAM needs to be defined.

An object of the present invention is to provide an efficient data transmission method.

Another object of the present invention is to provide a method for feeding back CSI for data having a high modulation order.

Another object of the present invention is to provide a method for feeding back CSI, when a Rank Indication (RI) reference process is configured.

Another object of the present invention is to provide apparatuses supporting the above methods.

It will be appreciated by persons skilled in the art that the objects that could be achieved with the present invention are not limited to what has been particularly described hereinabove and the above and other objects that the present invention could achieve will be more clearly understood from the following detailed description.

Technical Solution

The present invention relates to a wireless access system, and more particularly, to methods for transmitting and receiving Channel State information (CSI) to support 256-ary Quadrature Amplitude Modulation (256 QAM) and apparatuses supporting the methods.

In one aspect of the present invention, a method for reporting CSI by a User Equipment (UE) supporting 256 QAM in a wireless access system includes receiving a higher-layer signal for configuring a first Rank Indication (RI) reference process for the UE, measuring channel quality for one or more CSI processes associated with the first RI reference process configured for the UE, selecting a Channel Quality Indication (CQI) index using only a first CQI table or a second CQI table for the one or more CSI processes, and reporting CSI including the selected CQI index. The first CQI table supports up to 64 QAM, the second CQI table supports up to 256 QAM, and only the same CQI table is applied to the one or more CSI processes associated with the first RI reference process.

In another aspect of the present invention, a UE for reporting CSI in a wireless access system supporting 256 QAM includes a transmitter, a receiver, and a processor configured to support CSI reporting by controlling the transmitter and the receiver. The processor is configured to receive a higher-layer signal for configuring a first RI reference process by controlling the receiver, measure channel quality for one or more CSI processes associated with the first RI reference process configured for the UE by controlling the receiver, select a CQI index using only a first CQI table or a second CQI table for the one or more CSI processes, and report CSI report including the selected CQI index by controlling the transmitter. The first CQI table supports up to 64 QAM, the second CQI table supports up to 256 QAM, and only the same CQI table is applied to the one or more CSI processes associated with the first RI reference process.

In the aspects of the present invention, the same RI may be applied to the one or more CSI processes associated with the first RI reference process.

Each of the first CQI table and the second CQI table may have a size of 4 bits.

The higher-layer signal may further include configuration information for configuring a second RI reference process for the UE, and the same CQI table may be applied to one or more CSI processes associated with the second RI reference process.

It is to be understood that both the foregoing general description and the following detailed description of the present invention are exemplary and explanatory and are intended to provide further explanation of the invention as claimed.

Advantageous Effects

According to the embodiments of the present invention, the following effects can be achieved.

First, since a high-order modulation scheme is used according to a channel state, data can be transmitted and received efficiently.

Secondly, Channel State information (CSI) for data having a high modulation order can be fed back.

Thirdly, since a Channel Quality Indication (CQI) table is allocated for each individual CSI subframe set configured for a User Equipment (UE), a different modulation scheme is applied on a CSI subframe set basis, thereby reducing inter-cell interference.

Fourthly, a Modulation and Coding Scheme (MCS) correction error that may occur due to rank mismatch during downlink data transmission can be reduced by applying a CQI table individually to each Rank Indication (RI) reference process configured for a UE.

Additional advantages, objects, and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

DESCRIPTION OF DRAWINGS

The accompanying drawings, which are included to provide a further understanding of the invention, illustrate embodiments of the invention and together with the description serve to explain the principle of the invention.

FIG. 4 is a diagram illustrating a structure of an uplink subframe according to the embodiments.

FIG. 10 illustrates Acknowledgement (ACK)/Negative ACK (NACK) channelization for PUCCH formats 1a and 1b.

BEST MODE

Figure 1:
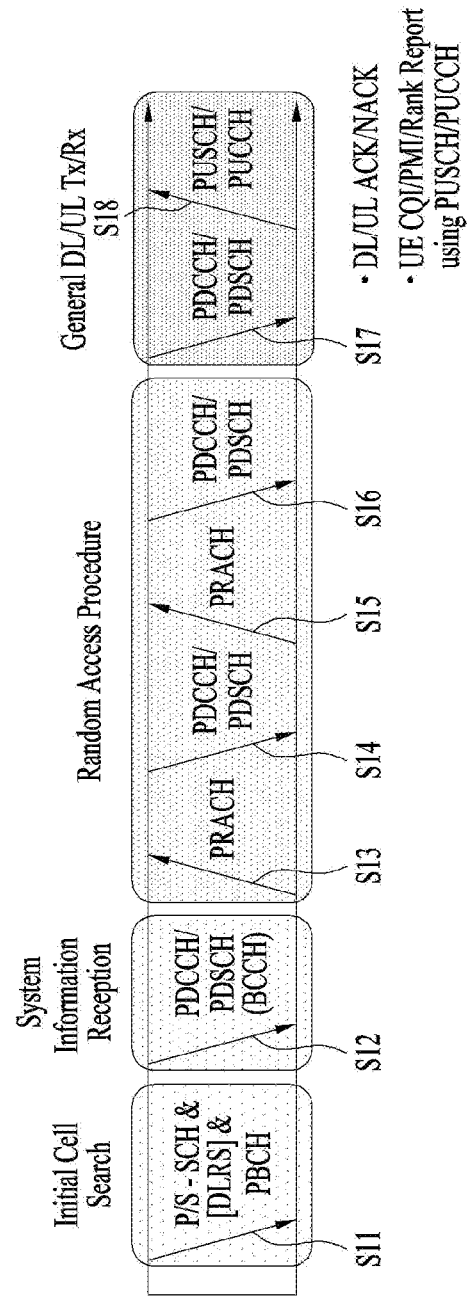
FIG. 1 is a conceptual diagram illustrating physical channels used in the embodiments and a signal transmission method using the physical channels.

The present invention relates to a wireless access system, and more particularly, to methods for transmitting and receiving Channel State information (CSI) to support 256-ary Quadrature Amplitude Modulation (256 QAM) and apparatuses supporting the methods.

The embodiments of the present disclosure described below are combinations of elements and features of the present disclosure in specific forms. The elements or features may be considered selective unless otherwise mentioned. Each element or feature may be practiced without being combined with other elements or features. Further, an embodiment of the present disclosure may be constructed by combining parts of the elements and/or features. Operation orders described in embodiments of the present disclosure may be rearranged. Some constructions or elements of any one embodiment may be included in another embodiment and may be replaced with corresponding constructions or features of another embodiment.

In the description of the attached drawings, a detailed description of known procedures or steps of the present disclosure will be avoided lest it should obscure the subject matter of the present disclosure. In addition, procedures or steps that could be understood to those skilled in the art will not be described either.

In the embodiments of the present disclosure, a description is mainly made of a data transmission and reception relationship between a Base Station (BS) and a User Equipment (UE). A BS refers to a terminal node of a network, which directly communicates with a UE. A specific operation described as being performed by the BS may be performed by an upper node of the BS.

Namely, it is apparent that, in a network comprised of a plurality of network nodes including a BS, various operations performed for communication with a UE may be performed by the BS, or network nodes other than the BS. The term 'BS' may be replaced with a fixed station, a Node B, an evolved Node B (eNode B or eNB), an Advanced Base Station (ABS), an access point, etc.

In the embodiments of the present disclosure, the term terminal may be replaced with a UE, a Mobile Station (MS), a Subscriber Station (SS), a Mobile Subscriber Station (MSS), a mobile terminal, an Advanced Mobile Station (AMS), etc.

A transmitter is a fixed and/or mobile node that provides a data service or a voice service and a receiver is a fixed and/or mobile node that receives a data service or a voice service. Therefore, a UE may serve as a transmitter and a BS may serve as a receiver, on an UpLink (UL). Likewise, the UE may serve as a receiver and the BS may serve as a transmitter, on a DownLink (DL).

The embodiments of the present disclosure may be supported by standard specifications disclosed for at least one of wireless access systems including an Institute of Electrical and Electronics Engineers (IEEE) 802.xx system, a 3$^{rd}$ Generation Partnership Project (3GPP) system, a 3GPP Long Term Evolution (LTE) system, and a 3GPP2 system. In particular, the embodiments of the present disclosure may be supported by the standard specifications, 3GPP TS 36.211, 3GPP TS 36.212, 3GPP TS 36.213, 3GPP TS 36.321 and 3GPP TS 36.331. That is, the steps or parts, which are not described to clearly reveal the technical idea of the present disclosure, in the embodiments of the present disclosure may be explained by the above standard specifications. All terms used in the embodiments of the present disclosure may be explained by the standard specifications.

Reference will now be made in detail to the embodiments of the present disclosure with reference to the accompanying drawings. The detailed description, which will be given below with reference to the accompanying drawings, is intended to explain exemplary embodiments of the present disclosure, rather than to show the only embodiments that can be implemented according to the invention.

The following detailed description includes specific terms in order to provide a thorough understanding of the present disclosure. However, it will be apparent to those skilled in the art that the specific terms may be replaced with other terms without departing the technical spirit and scope of the present disclosure.

For example, the term used in embodiments of the present disclosure, a data block is interchangeable with a transport block in the same meaning. In addition, the MCS/TBS index table used in the LTE/LTE-A system can be defined as a first table or a legacy table, and the MCS/TBS index table which is used for supporting the 256 QAM can be defined as a second table or a new table.

The embodiments of the present disclosure can be applied to various wireless access systems such as Code Division Multiple Access (CDMA), Frequency Division Multiple Access (FDMA), Time Division Multiple Access (TDMA), Orthogonal Frequency Division Multiple Access (OFDMA), Single Carrier Frequency Division Multiple Access (SC-FDMA), etc.

CDMA may be implemented as a radio technology such as Universal Terrestrial Radio Access (UTRA) or CDMA2000. TDMA may be implemented as a radio technology such as Global System for Mobile communications (GSM)/General packet Radio Service (GPRS)/Enhanced Data Rates for GSM Evolution (EDGE). OFDMA may be implemented as a radio technology such as IEEE 802.11 (Wi-Fi), IEEE 802.16 (WiMAX), IEEE 802.20, Evolved UTRA (E-UTRA), etc.

UTRA is a part of Universal Mobile Telecommunications System (UMTS). 3GPP LTE is a part of Evolved UMTS (E-UMTS) using E-UTRA, adopting OFDMA for DL and SC-FDMA for UL. LTE-Advanced (LTE-A) is an evolution of 3GPP LTE. While the embodiments of the present disclosure are described in the context of a 3GPP LTE/LTE-A system in order to clarify the technical features of the present disclosure, the present disclosure is also applicable to an IEEE 802.16e/m system, etc.

1.3GPP LTE/LTE-A System

In a wireless access system, a UE receives information from an eNB on a DL and transmits information to the eNB on a UL. The information transmitted and received between the UE and the eNB includes general data information and various types of control information. There are many physical channels according to the types/usages of information transmitted and received between the eNB and the UE.

1.1 System Overview

FIG. 1 illustrates physical channels and a general method using the physical channels, which may be used in embodiments of the present disclosure.

When a UE is powered on or enters a new cell, the UE performs initial cell search (S11). The initial cell search involves acquisition of synchronization to an eNB. Specifically, the UE synchronizes its timing to the eNB and acquires information such as a cell Identifier (ID) by receiving a Primary Synchronization Channel (P-SCH) and a Secondary Synchronization Channel (S-SCH) from the eNB.

Then the UE may acquire information broadcast in the cell by receiving a Physical Broadcast Channel (PBCH) from the eNB. During the initial cell search, the UE may monitor a DL channel state by receiving a Downlink Reference Signal (DL RS).

After the initial cell search, the UE may acquire more detailed system information by receiving a Physical Downlink Control Channel (PDCCH) and receiving a Physical Downlink Shared Channel (PDSCH) based on information of the PDCCH (S12).

To complete connection to the eNB, the UE may perform a random access procedure with the eNB (S13 to S16). In the random access procedure, the UE may transmit a preamble on a Physical Random Access Channel (PRACH) (S13) and may receive a PDCCH and a PDSCH associated with the PDCCH (S14). In the case of contention-based random access, the UE may additionally perform a contention resolution procedure including transmission of an additional PRACH (S15) and reception of a PDCCH signal and a PDSCH signal corresponding to the PDCCH signal (S16).

After the above procedure, the UE may receive a PDCCH and/or a PDSCH from the eNB (S17) and transmit a Physical Uplink Shared Channel (PUSCH) and/or a Physical Uplink Control Channel (PUCCH) to the eNB (S18), in a general UL/DL signal transmission procedure.

Control information that the UE transmits to the eNB is generically called Uplink Control Information (UCI). The UCI includes a Hybrid Automatic Repeat and reQuest Acknowledgement/Negative Acknowledgement (HARQ-ACK/NACK), a Scheduling Request (SR), a Channel Quality Indication (CQI), a Precoding Matrix Index (PMI), a Rank Indication (RI), etc.

In the LTE system, UCI is generally transmitted on a PUCCH periodically. However, if control information and traffic data should be transmitted simultaneously, the control information and traffic data may be transmitted on a PUSCH. In addition, the UCI may be transmitted aperiodically on the PUSCH, upon receipt of a request/command from a network.

Figure 2:
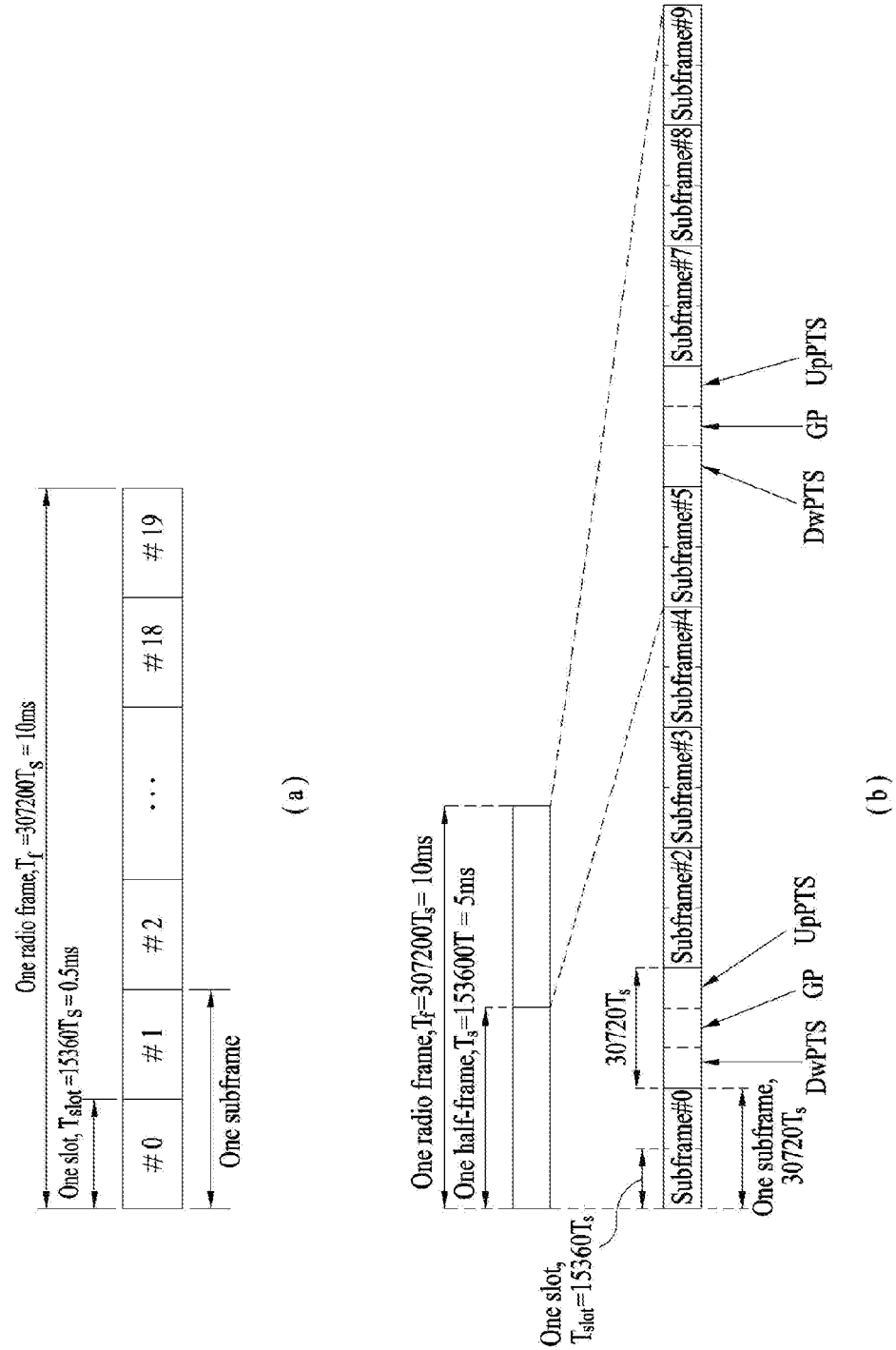
FIG. 2 is a diagram illustrating a structure of a radio frame for use in the embodiments.

FIG. 2 illustrates exemplary radio frame structures used in embodiments of the present disclosure.

FIG. 2(a) illustrates frame structure type 1. Frame structure type 1 is applicable to both a full Frequency Division Duplex (FDD) system and a half FDD system.

One radio frame is 10 ms ($T_f=307200 \cdot T_s$) long, including equal-sized 20 slots indexed from 0 to 19. Each slot is 0.5 ms ($T_{slot}=15360 \cdot T_s$) long. One subframe includes two successive slots. An $i^{th}$ subframe includes $2i^{th}$ and $(2i+1)^{th}$ slots. That is, a radio frame includes 10 subframes. A time required for transmitting one subframe is defined as a Transmission Time Interval (TTI). $T_s$ is a sampling time given as $T_s=1/(15 \text{ kHz} \times 2048)=3.2552 \times 10^{-8}$ (about 33 ns). One slot includes a plurality of Orthogonal Frequency Division Multiplexing (OFDM) symbols or SC-FDMA symbols in the time domain by a plurality of Resource Blocks (RBs) in the frequency domain.

A slot includes a plurality of OFDM symbols in the time domain. Since OFDMA is adopted for DL in the 3GPP LTE system, one OFDM symbol represents one symbol period. An OFDM symbol may be called an SC-FDMA symbol or symbol period. An RB is a resource allocation unit including a plurality of contiguous subcarriers in one slot.

In a full FDD system, each of 10 subframes may be used simultaneously for DL transmission and UL transmission during a 10-ms duration. The DL transmission and the UL transmission are distinguished by frequency. On the other hand, a UE cannot perform transmission and reception simultaneously in a half FDD system.

The above radio frame structure is purely exemplary. Thus, the number of subframes in a radio frame, the number of slots in a subframe, and the number of OFDM symbols in a slot may be changed.

FIG. 2(b) illustrates frame structure type 2. Frame structure type 2 is applied to a Time Division Duplex (TDD) system. One radio frame is 10 ms ($T_f$=307200·$T_s$) long, including two half-frames each having a length of 5 ms (=153600·$T_s$) long. Each half-frame includes five subframes each being 1 ms (=30720·$T_s$) long. An $i^{th}$ subframe includes $2i^{th}$ and $(2i+1)^{th}$ slots each having a length of 0.5 ms ($T_{slot}$=15360·$T_s$). $T_s$ is a sampling time given as $T_s$=1/(15 kHz×2048)=3.2552×10$^{-8}$ (about 33 ns).

A type-2 frame includes a special subframe having three fields, Downlink Pilot Time Slot (DwPTS), Guard Period (GP), and Uplink Pilot Time Slot (UpPTS). The DwPTS is used for initial cell search, synchronization, or channel estimation at a UE, and the UpPTS is used for channel estimation and UL transmission synchronization with a UE at an eNB. The GP is used to cancel UL interference between a UL and a DL, caused by the multi-path delay of a DL signal.

[Table 1] below lists special subframe configurations (DwPTS/GP/UpPTS lengths).

Referring to FIG. 4, a UL subframe may be divided into a control region and a data region in the frequency domain. A PUCCH carrying UCI is allocated to the control region and a PUSCH carrying user data is allocated to the data region. To maintain a single carrier property, a UE does not transmit a PUCCH and a PUSCH simultaneously. A pair of RBs in a subframe are allocated to a PUCCH for a UE. The RBs of the RB pair occupy different subcarriers in two slots. Thus it is said that the RB pair frequency-hops over a slot boundary.

Figure 5:
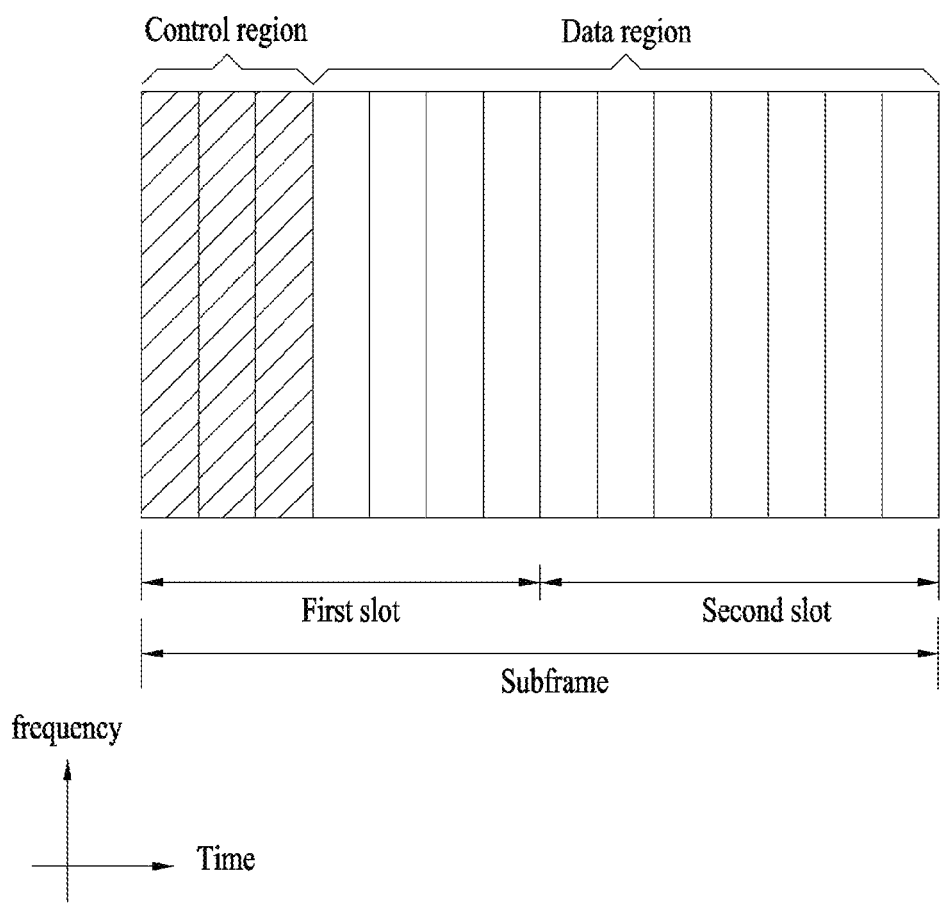
FIG. 5 is a diagram illustrating a structure of a downlink subframe according to the embodiments.

FIG. 5 illustrates a structure of a DL subframe that may be used in embodiments of the present disclosure.

Referring to FIG. 5, up to three OFDM symbols of a DL subframe, starting from OFDM symbol 0 are used as a control region to which control channels are allocated and the other OFDM symbols of the DL subframe are used as a data region to which a PDSCH is allocated. DL control channels defined for the 3GPP LTE system include a Physical Control Format Indicator Channel (PCFICH), a PDCCH, and a Physical Hybrid ARQ Indicator Channel (PHICH).

The PCFICH is transmitted in the first OFDM symbol of a subframe, carrying information about the number of OFDM symbols used for transmission of control channels (i.e. the size of the control region) in the subframe. The PHICH is a response channel to a UL transmission, delivering an HARQ ACK/NACK signal. Control information carried on the PDCCH is called Downlink Control Information (DCI). The DCI transports UL resource assignment information, DL resource assignment information, or UL Transmission (Tx) power control commands for a UE group.

TABLE 1

| Special subframe configuration | Normal cyclic prefix in downlink | | | Extended cyclic prefix in downlink | | |
| --- | --- | --- | --- | --- | --- | --- |
| | | UpPTS | | | UpPTS | |
| | DwPTS | Normal cyclic prefix in uplink | Extended cyclic prefix in uplink | DwPTS | Normal cyclic prefix in uplink | Extended cyclic prefix in uplink |
| 0 | 6592 · $T_s$ | 2192 · $T_s$ | 2560 · $T_s$ | 7680 · $T_s$ | 2192 · $T_s$ | 2560 · $T_s$ |
| 1 | 19760 · $T_s$ | | | 20480 · $T_s$ | | |
| 2 | 21952 · $T_s$ | | | 23040 · $T_s$ | | |
| 3 | 24144 · $T_s$ | | | 25600 · $T_s$ | | |
| 4 | 26336 · $T_s$ | | | 7680 · $T_s$ | 4384 · $T_s$ | 5120 · $T_s$ |
| 5 | 6592 · $T_s$ | 4384 · $T_s$ | 5120 · $T_s$ | 20480 · $T_s$ | | |
| 6 | 19760 · $T_s$ | | | 23040 · $T_s$ | | |
| 7 | 21952 · $T_s$ | | | — | — | — |
| 8 | 24144 · $T_s$ | | | — | — | — |

Figure 3:
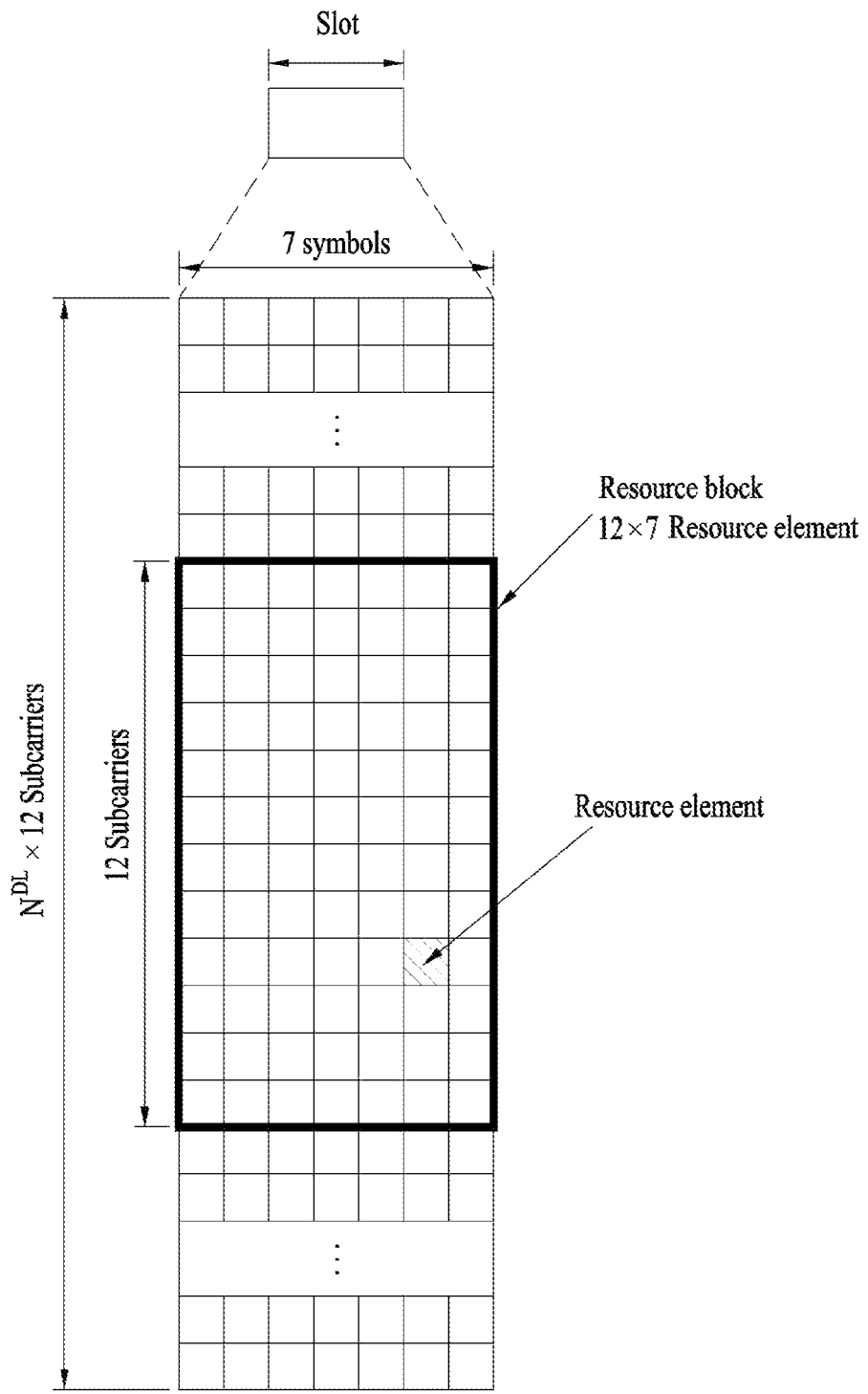
FIG. 3 is a diagram illustrating an example of a resource grid of a downlink slot according to the embodiments.

FIG. 3 illustrates an exemplary structure of a DL resource grid for the duration of one DL slot, which may be used in embodiments of the present disclosure.

Referring to FIG. 3, a DL slot includes a plurality of OFDM symbols in the time domain. One DL slot includes 7 OFDM symbols in the time domain and an RB includes 12 subcarriers in the frequency domain, to which the present disclosure is not limited.

Each element of the resource grid is referred to as a Resource Element (RE). An RB includes 12×7 REs. The number of RBs in a DL slot, $N_{DL}$ depends on a DL transmission bandwidth. A UL slot may have the same structure as a DL slot.

FIG. 4 illustrates a structure of a UL subframe which may be used in embodiments of the present disclosure.

1.2 Physical Downlink Control Channel (PDCCH)

1.2.1 PDCCH Overview

The PDCCH may deliver information about resource allocation and a transport format for a Downlink Shared Channel (DL-SCH) (i.e. a DL grant), information about resource allocation and a transport format for an Uplink Shared Channel (UL-SCH) (i.e. a UL grant), paging information of a Paging Channel (PCH), system information on the DL-SCH, information about resource allocation for a higher-layer control message such as a random access response transmitted on the PDSCH, a set of Tx power control commands for individual UEs of a UE group, Voice Over Internet Protocol (VoIP) activation indication information, etc.

A plurality of PDCCHs may be transmitted in the control region. A UE may monitor a plurality of PDCCHs. A PDCCH is transmitted in an aggregate of one or more consecutive Control Channel Elements (CCEs). A PDCCH made up of one or more consecutive CCEs may be transmitted in the control region after subblock interleaving. A CCE is a logical allocation unit used to provide a PDCCH at a code rate based on the state of a radio channel A CCE includes a plurality of RE Groups (REGs). The format of a PDCCH and the number of available bits for the PDCCH are determined according to the relationship between the number of CCEs and a code rate provided by the CCEs.

1.2.2 PDCCH Structure

A plurality of PDCCHs for a plurality of UEs may be multiplexed and transmitted in the control region. A PDCCH is made up of an aggregate of one or more consecutive CCEs. A CCE is a unit of 9 REGs each REG including 4 REs. Four Quadrature Phase Shift Keying (QPSK) symbols are mapped to each REG. REs occupied by RSs are excluded from REGs. That is, the total number of REGs in an OFDM symbol may be changed depending on the presence or absence of a cell-specific RS. The concept of an REG to which four REs are mapped is also applicable to other DL control channels (e.g. the PCFICH or the PHICH). Let the number of REGs that are not allocated to the PCFICH or the PHICH be denoted by $N_{REG}$. Then the number of CCEs available to the system is $N_{CCE}=\lfloor N_{REG}/9 \rfloor$) and the CCEs are indexed from 0 to $N_{CCE}-1$.

To simplify the decoding process of a UE, a PDCCH format including n CCEs may start with a CCE having an index equal to a multiple of n. That is, given CCE i, the PDCCH format may start with a CCE satisfying i mod n=0

The eNB may configure a PDCCH with 1, 2, 4, or 8 CCEs. {1, 2, 4, 8} are called CCE aggregation levels. The number of CCEs used for transmission of a PDCCH is determined according to a channel state by the eNB. For example, one CCE is sufficient for a PDCCH directed to a UE in a good DL channel state (a UE near to the eNB). On the other hand, 8 CCEs may be required for a PDCCH directed to a UE in a poor DL channel state (a UE at a cell edge) in order to ensure sufficient robustness.

[Table 2] below illustrates PDCCH formats. 4 PDCCH formats are supported according to CCE aggregation levels as illustrated in [Table 2].

TABLE 2

| PDCCH format | Number of CCEs (n) | Number of REGs | Number of PDCCH bits |
|---|---|---|---|
| 0 | 1 | 9 | 72 |
| 1 | 2 | 18 | 144 |
| 2 | 4 | 36 | 288 |
| 3 | 8 | 72 | 576 |

A different CCE aggregation level is allocated to each UE because the format or Modulation and Coding Scheme (MCS) level of control information delivered in a PDCCH for the UE is different. An MCS level defines a code rate used for data coding and a modulation order. An adaptive MCS level is used for link adaptation. In general, three or four MCS levels may be considered for control channels carrying control information.

Regarding the formats of control information, control information transmitted on a PDCCH is called DCI. The configuration of information in PDCCH payload may be changed depending on the DCI format. The PDCCH payload is information bits. [Table 3] lists DCI according to DCI formats.

TABLE 3

| DCI Format | Description |
|---|---|
| Format 0 | Resource grants for the PUSCH transmissions (uplink) |
| Format 1 | Resource assignments for single codeword PDSCH transmissions (transmission modes 1, 2 and 7) |
| Format 1A | Compact signaling of resource assignments for single codeword PDSCH (all modes) |
| Format 1B | Compact resource assignments for PDSCH using rank-1 closed loop precoding (mode 6) |
| Format 1C | Very compact resource assignments for PDSCH (e.g. paging/broadcast system information) |
| Format 1D | Compact resource assignments for PDSCH using multi-user MIMO (mode 5) |
| Format 2 | Resource assignments for PDSCH for closed-loop MIMO operation (mode 4) |
| Format 2A | Resource assignments for PDSCH for open-loop MIMO operation (mode 3) |
| Format 3/3A | Power control commands for PUCCH and PUSCH with 2-bit/1-bit power adjustment |
| Format 4 | Scheduling of PUSCH in one UL cell with multi-antenna port transmission mode |

Referring to [Table 3], the DCI formats include Format 0 for PUSCH scheduling, Format 1 for single-codeword PDSCH scheduling, Format 1A for compact single-codeword PDSCH scheduling, Format 1C for very compact DL-SCH scheduling, Format 2 for PDSCH scheduling in a closed-loop spatial multiplexing mode, Format 2A for PDSCH scheduling in an open-loop spatial multiplexing mode, and Format 3/3A for transmission of Transmission Power Control (TPC) commands for uplink channels. DCI Format 1A is available for PDSCH scheduling irrespective of the transmission mode of a UE.

The length of PDCCH payload may vary with DCI formats. In addition, the type and length of PDCCH payload may be changed depending on compact or non-compact scheduling or the transmission mode of a UE.

The transmission mode of a UE may be configured for DL data reception on a PDSCH at the UE. For example, DL data carried on a PDSCH includes scheduled data, a paging message, a random access response, broadcast information on a BCCH, etc. for a UE. The DL data of the PDSCH is related to a DCI format signaled through a PDCCH. The transmission mode may be configured semi-statically for the UE by higher-layer signaling (e.g. Radio Resource Control (RRC) signaling). The transmission mode may be classified as single antenna transmission or multi-antenna transmission.

A transmission mode is configured for a UE semi-statically by higher-layer signaling. For example, multi-antenna transmission scheme may include transmit diversity, open-loop or closed-loop spatial multiplexing, Multi-User Multiple Input Multiple Output (MU-MIMO), or beamforming. Transmit diversity increases transmission reliability by transmitting the same data through multiple Tx antennas. Spatial multiplexing enables high-speed data transmission without increasing a system bandwidth by simultaneously transmitting different data through multiple Tx antennas. Beamforming is a technique of increasing the Signal to Interference plus Noise Ratio (SINR) of a signal by weighting multiple antennas according to channel states.

A DCI format for a UE depends on the transmission mode of the UE. The UE has a reference DCI format monitored according to the transmission mode configure for the UE. The following 10 transmission modes are available to UEs:

Transmission mode 1: Single antenna port (port 0);
Transmission mode 2: Transmit diversity;
Transmission mode 3: Open-loop spatial multiplexing when the number of layer is larger than 1 or Transmit diversity when the rank is 1;
Transmission mode 4: Closed-loop spatial multiplexing;
Transmission mode 5: MU-MIMO;
Transmission mode 6: Closed-loop rank-1 precoding;
Transmission mode 7: Precoding supporting a single layer transmission, which does not based on a codebook (Rel-8);
Transmission mode 8: Precoding supporting up to two layers, which do not based on a codebook (Rel-9);
Transmission mode 9: Precoding supporting up to eight layers, which do not based on a codebook (Rel-10); and
Transmission mode 10: Precoding supporting up to eight layers, which do not based on a codebook, used for CoMP (Rel-11).

1.2.3 PDCCH Transmission

The eNB determines a PDCCH format according to DCI that will be transmitted to the UE and adds a Cyclic Redundancy Check (CRC) to the control information. The CRC is masked by a unique Identifier (ID) (e.g. a Radio Network Temporary Identifier (RNTI)) according to the owner or usage of the PDCCH. If the PDCCH is destined for a specific UE, the CRC may be masked by a unique ID (e.g. a cell-RNTI (C-RNTI)) of the UE. If the PDCCH carries a paging message, the CRC of the PDCCH may be masked by a paging indicator ID (e.g. a Paging-RNTI (P-RNTI)). If the PDCCH carries system information, particularly, a System Information Block (SIB), its CRC may be masked by a system information ID (e.g. a System Information RNTI (SI-RNTI)). To indicate that the PDCCH carries a random access response to a random access preamble transmitted by a UE, its CRC may be masked by a Random Access-RNTI (RA-RNTI).

Then the eNB generates coded data by channel-encoding the CRC-added control information. The channel coding may be performed at a code rate corresponding to an MCS level. The eNB rate-matches the coded data according to a CCE aggregation level allocated to a PDCCH format and generates modulation symbols by modulating the coded data. Herein, a modulation order corresponding to the MCS level may be used for the modulation. The CCE aggregation level for the modulation symbols of a PDCCH may be one of 1, 2, 4, and 8. Subsequently, the eNB maps the modulation symbols to physical REs (i.e. CCE to RE mapping).

1.2.4 Blind Decoding (BD)

A plurality of PDCCHs may be transmitted in a subframe. That is, the control region of a subframe includes a plurality of CCEs, CCE 0 to CCE $N_{CCE,k}-1$. $N_{CCE,k}$ is the total number of CCEs in the control region of a $k^{th}$ subframe. A UE monitors a plurality of PDCCHs in every subframe. This means that the UE attempts to decode each PDCCH according to a monitored PDCCH format.

The eNB does not provide the UE with information about the position of a PDCCH directed to the UE in an allocated control region of a subframe. Without knowledge of the position, CCE aggregation level, or DCI format of its PDCCH, the UE searches for its PDCCH by monitoring a set of PDCCH candidates in the subframe in order to receive a control channel from the eNB. This is called blind decoding. Blind decoding is the process of demasking a CRC part with a UE ID, checking a CRC error, and determining whether a corresponding PDCCH is a control channel directed to a UE by the UE.

The UE monitors a PDCCH in every subframe to receive data transmitted to the UE in an active mode. In a Discontinuous Reception (DRX) mode, the UE wakes up in a monitoring interval of every DRX cycle and monitors a PDCCH in a subframe corresponding to the monitoring interval. The PDCCH-monitored subframe is called a non-DRX subframe.

To receive its PDCCH, the UE should blind-decode all CCEs of the control region of the non-DRX subframe. Without knowledge of a transmitted PDCCH format, the UE should decode all PDCCHs with all possible CCE aggregation levels until the UE succeeds in blind-decoding a PDCCH in every non-DRX subframe. Since the UE does not know the number of CCEs used for its PDCCH, the UE should attempt detection with all possible CCE aggregation levels until the UE succeeds in blind decoding of a PDCCH.

In the LTE system, the concept of Search Space (SS) is defined for blind decoding of a UE. An SS is a set of PDCCH candidates that a UE will monitor. The SS may have a different size for each PDCCH format. There are two types of SSs, Common Search Space (CSS) and UE-specific/Dedicated Search Space (USS).

While all UEs may know the size of a CSS, a USS may be configured for each individual UE. Accordingly, a UE should monitor both a CSS and a USS to decode a PDCCH. As a consequence, the UE performs up to 44 blind decodings in one subframe, except for blind decodings based on different CRC values (e.g., C-RNTI, P-RNTI, SI-RNTI, and RA-RNTI).

In view of the constraints of an SS, the eNB may not secure CCE resources to transmit PDCCHs to all intended UEs in a given subframe. This situation occurs because the remaining resources except for allocated CCEs may not be included in an SS for a specific UE. To minimize this obstacle that may continue in the next subframe, a UE-specific hopping sequence may apply to the starting point of a USS.

[Table 4] illustrates the sizes of CSSs and USSs.

TABLE 4

| PDCCH format | Number of CCEs (n) | Number of candidates in common search space | Number of candidates in dedicated search space |
|---|---|---|---|
| 0 | 1 | — | 6 |
| 1 | 2 | — | 6 |
| 2 | 4 | 4 | 2 |
| 3 | 8 | 2 | 2 |

To mitigate the load of the UE caused by the number of blind decoding attempts, the UE does not search for all defined DCI formats simultaneously. Specifically, the UE always searches for DCI Format 0 and DCI Format 1A in a USS. Although DCI Format 0 and DCI Format 1A are of the same size, the UE may distinguish the DCI formats by a flag for format0/format 1a differentiation included in a PDCCH. Other DCI formats than DCI Format 0 and DCI Format 1A, such as DCI Format 1, DCI Format 1B, and DCI Format 2 may be required for the UE.

The UE may search for DCI Format 1A and DCI Format 1C in a CSS. The UE may also be configured to search for DCI Format 3 or 3A in the CSS. Although DCI Format 3 and DCI Format 3A have the same size as DCI Format 0 and DCI Format 1A, the UE may distinguish the DCI formats by a CRC scrambled with an ID other than a UE-specific ID.

An SS $S_k^{(L)}$ is a PDCCH candidate set with a CCE aggregation level $L \in \{1,2,4,8\}$. The CCEs of PDCCH candidate set m in the SS may be determined by the following equation.

$$L \cdot \{(Y_k+m) \bmod \lfloor N_{CCE,k}/L \rfloor\}+i \quad \text{[Equation 1]}$$

where $M^{(L)}$ is the number of PDCCH candidates with CCE aggregation level L to be monitored in the SS, $m=0, \ldots, M^{(L)}-1$, i is the index of a CCE in each PDCCH candidate, and $i=0, \ldots, L-1$, $k=\lfloor n_s/2 \rfloor$ where $n_s$ is the index of a slot in a radio frame.

As described before, the UE monitors both the USS and the CSS to decode a PDCCH. The CSS supports PDCCHs with CCE aggregation levels {4, 8} and the USS supports PDCCHs with CCE aggregation levels {1, 2, 4, 8}. [Table 5] illustrates PDCCH candidates monitored by a UE.

TABLE 5

| Type | Search space $S_k^{(L)}$ Aggregation level L | Size [in CCEs] | Number of PDCCH candidates $M^{(L)}$ |
|---|---|---|---|
| UE-specific | 1 | 6 | 6 |
| | 2 | 12 | 6 |
| | 4 | 8 | 2 |
| | 8 | 16 | 2 |
| Common | 4 | 16 | 4 |
| | 8 | 16 | 2 |

Referring to [Equation 1], for two aggregation levels, L=4 and L=8, $Y_k$ is set to 0 in the CSS, whereas $Y_k$ is defined by [Equation 2] for aggregation level L in the USS.

$$Y_k=(A \cdot Y_{k-1}) \bmod D \quad \text{[Equation 2]}$$

where $Y_{-1}=n_{RNTI} \neq 0$, $n_{RNTI}$ indicating an RNTI value. A=39827 and D=65537.

1.3. PUCCH (Physical Uplink Control Channel)

PUCCH may include the following formats to transmit control information.

(1) Format 1: On-Off keying (OOK) modulation, used for SR (Scheduling Request)

(2) Format 1a & 1b: Used for ACK/NACK transmission
1) Format 1a: BPSK ACK/NACK for 1 codeword
2) Format 1b: QPSK ACK/NACK for 2 codewords (3) Format 2: QPSK modulation, used for CQI transmission (4) Format 2a & Format 2b: Used for simultaneous transmission of CQI and ACK/NACK Table 6 shows a modulation scheme according to PUCCH format and the number of bits per subframe. Table 7 shows the number of reference signals (RS) per slot according to PUCCH format. Table 8 shows SC-FDMA symbol location of RS (reference signal) according to PUCCH format. In Table 6, PUCCH format 2a and PUCCH format 2b correspond to a case of normal cyclic prefix (CP).

TABLE 6

| PUCCH format | Modulation scheme | No. of bits per subframe, Mbit |
|---|---|---|
| 1 | N/A | N/A |
| 1a | BPSK | 1 |
| 1b | QPSK | 2 |
| 2 | QPSK | 20 |
| 2a | QPSK + BPSK | 21 |
| 2b | QPSK + BPSK | 22 |

TABLE 7

| PUCCH format | Normal CP | Extended CP |
|---|---|---|
| 1, 1a, 1b | 3 | 2 |
| 2 | 2 | 1 |
| 2a, 2b | 2 | N/A |

TABLE 8

| | SC-FDMA symbol location of RS | |
|---|---|---|
| PUCCH format | Normal CP | Extended CP |
| 1, 1a, 1b | 2, 3, 4 | 2, 3 |
| 2, 2a, 2b | 1, 5 | 3 |

Figure 6:
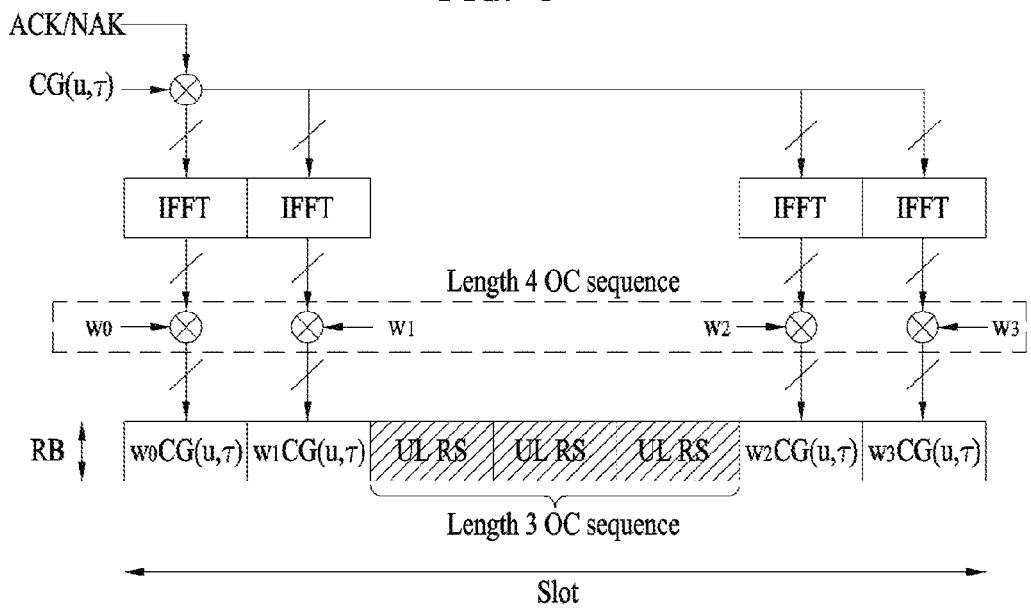
FIG. 6 illustrates Physical Uplink Control Channel (PUCCH) formats 1a and 1b for use in a normal Cyclic Prefix (CP) case.
Figure 7:
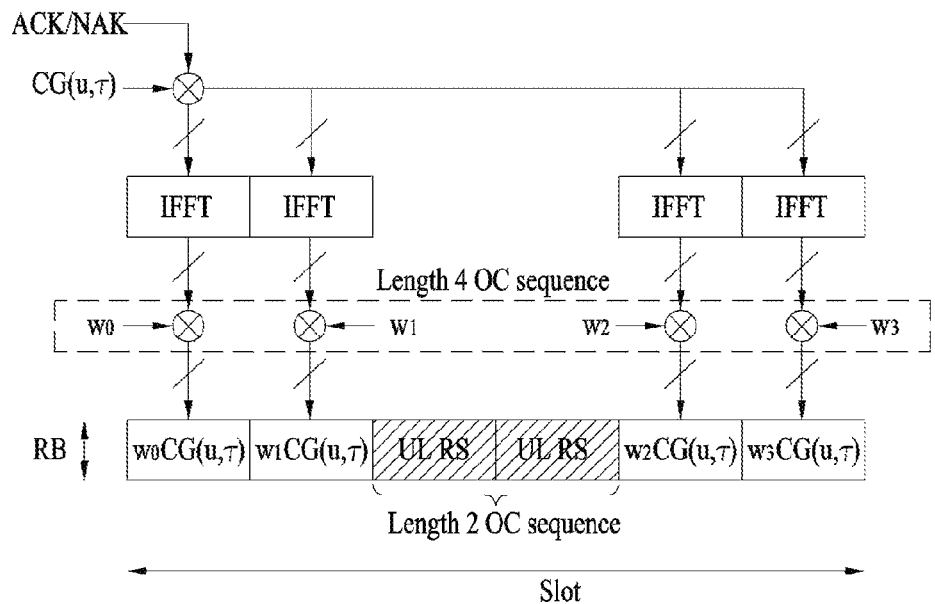
FIG. 7 illustrates PUCCH formats 1a and 1b for use in an extended CP case.

FIG. 6 shows PUCCH formats 1a and 1b in case of a normal cyclic prefix. And, FIG. 7 shows PUCCH formats 1a and 1b in case of an extended cyclic prefix.

According to the PUCCH formats 1a and 1b, control information of the same content is repeated in a subframe by slot unit. In each UE, ACK/NACK signal is transmitted on a different resource constructed with a different Cyclic Shift (CS) (frequency domain code) and an Orthogonal Cover (OC) or Orthogonal Cover Code (OCC) (time domain spreading code) of Computer-Generated Constant Amplitude Zero Auto Correlation (CG-CAZAC) sequence. For instance, the OC includes Walsh/DFT orthogonal code. If the number of CS and the number of OC are 6 and 3, respectively, total 18 UEs may be multiplexed within the same Physical Resource Block (PRB) with reference to a single antenna. Orthogonal sequences w0, w1, w2 and w3 may be applicable to a random time domain (after FFT modulation) or a random frequency domain (before FFT modulation).

For persistent scheduling with SR, ACK/NACK resource constructed with CS, OC and PRB may be allocated to a UE through RRC. For non-persistent scheduling with dynamic ACK/NACK, the ACK/NACK resource may be implicitly allocated to a UE using a smallest CCE index of PDCCH corresponding to PDSCH.

Length-4 OC and length-3 orthogonal sequence for PUCCH format 1/1a/1b are shown in Table 9 and Table 10, respectively.

TABLE 9

| Sequence index $n_{oc}$ ($n_s$) | Orthogonal sequences$^{[w(0) \ldots w(NSFPUCCH - 1)]}$ |
|---|---|
| 0 | [+1 +1 +1 +1] |
| 1 | [+1 −1 +1 −1] |
| 2 | [+1 −1 −1 +1] |

TABLE 10

| Sequence index $n_{oc}$ ($n_s$) | Orthogonal sequences$^{[w(0) \ldots w(NSFPUCCH - 1)]}$ |
|---|---|
| 0 | [1 1 1] |
| 1 | [1 $e^{j2\pi/3}$ $e^{j4\pi/3}$] |
| 2 | [1 $e^{j4\pi/3}$ $e^{j2\pi/3}$] |

OC $[\overline{w}(0) \ldots \overline{w}(N_{RS}^{PUCCH}-1)]$ for a reference signal in PUCCH format 1/1a/1b is shown in Table 11.

TABLE 11

| Sequence index $\overline{n}_{oc}(n_s)$ | Normal cyclic prefix | Extended cyclic prefix |
|---|---|---|
| 0 | [1 1 1] | [1 1] |
| 1 | [1 $e^{j2\pi/3}$ $e^{j4\pi/3}$] | [1 −1] |
| 2 | [1 $e^{j4\pi/3}$ $e^{j2\pi/3}$] | N/A |

Figure 8:
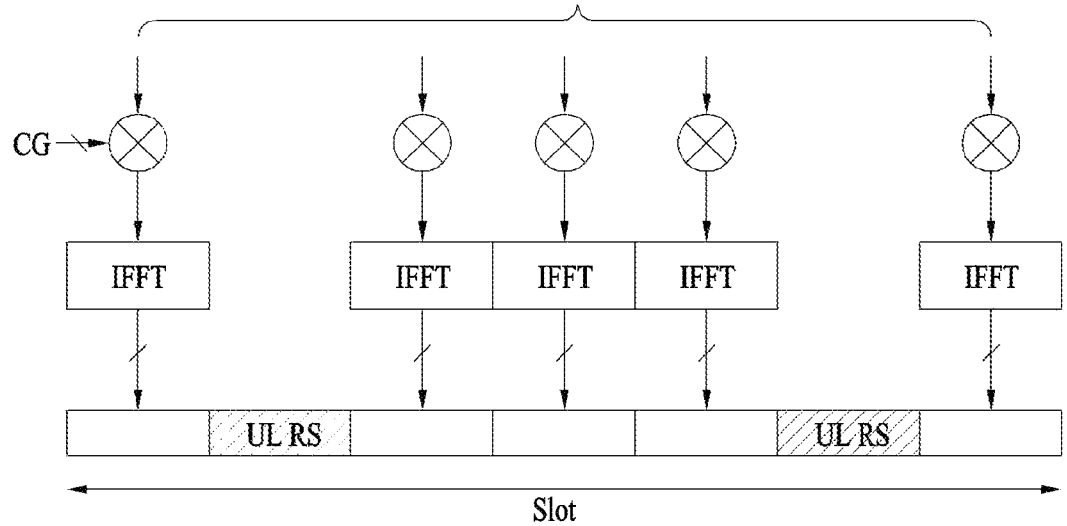
FIG. 8 illustrates PUCCH formats 2/2a/2b in a normal CP case.

FIG. 8 shows PUCCH format 2/2a/2b in case of a normal Cyclic Prefix (CP). And, FIG. 9 shows PUCCH format 2/2a/2b in case of an extended cyclic prefix.

Figure 9:
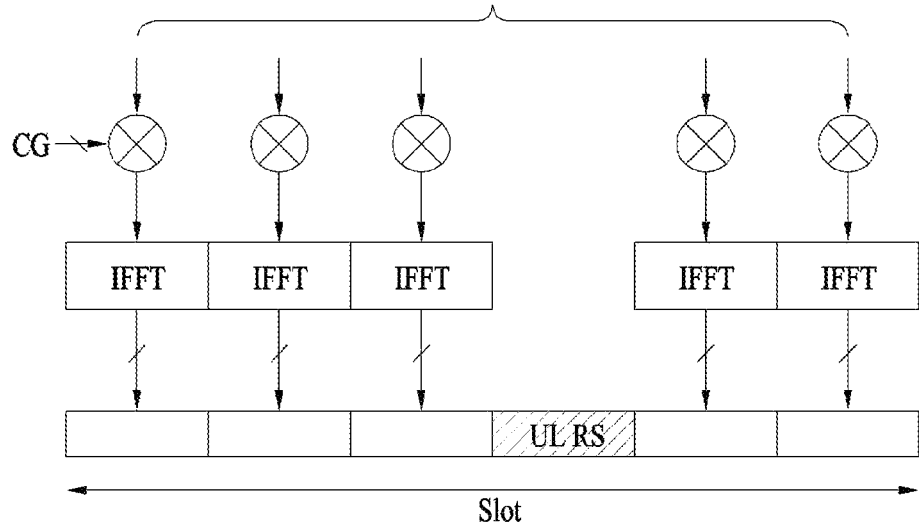
FIG. 9 illustrates PUCCH formats 2/2a/2b in an extended CP case.

Referring to FIG. 8 and FIG. 9, in case of a normal CP, a subframe is constructed with 10 QPSK data symbols as well as RS symbol. Each QPSK symbol is spread in a frequency domain by CS and is then mapped to a corresponding SC-FDMA symbol. SC-FDMA symbol level CS hopping may be applied to randomize inter-cell interference. The RS may be multiplexed by CDM using a cyclic shift. For instance, assuming that the number of available CSs is 12, 12 UEs may be multiplexed in the same PRB. For instance, assuming that the number of available CSs is 6, 6 UEs may be multiplexed in the same PRB. In brief, a plurality of UEs in PUCCH format 1/1a/1b and PUCCH format 2/2a/2b may be multiplexed by 'CS+OC+PRB' and 'CS+PRB', respectively.

FIG. 10 is a diagram of ACK/NACK channelization for PUCCH formats 1a and 1b. In particular, FIG. 10 corresponds to a case of '$\Delta_{shift}^{PUCCH}=2$'

Figure 11:
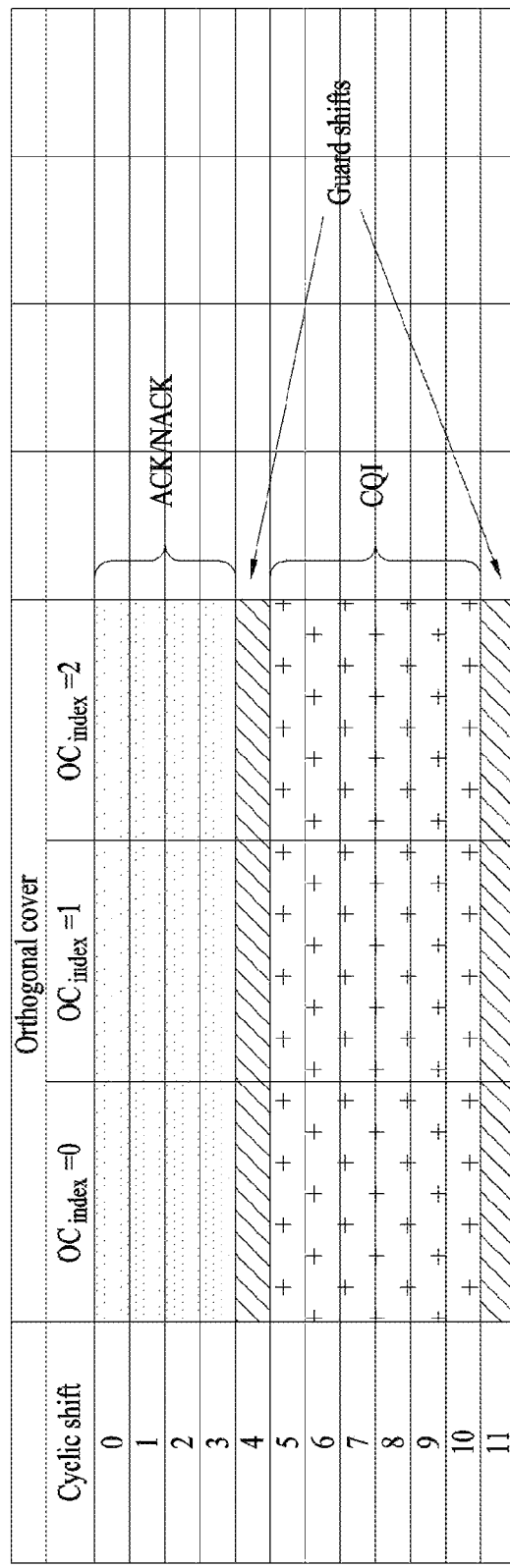
FIG. 11 illustrates channelization for a hybrid structure of PUCCH format 1a/1b and format 2/2a/2b in the same Physical Resource Block (PRB).

FIG. 11 is a diagram of channelization for a hybrid structure of PUCCH format 1/1a/1b and PUCCH format 2/2a/2b.

CS hopping and OC remapping may be applicable in a following manner (1) Symbol-based cell-specific CS hopping for randomization of inter-cell interference (2) Slot level CS/OC remapping 1) For inter-cell interference randomization 2) Slot based access for mapping between ACK/NACK channel and resource (k)

Meanwhile, resource $n_r$ for PUCCH format 1/1a/1b may include the following combinations.

(1) CS (=equal to DFT orthogonal code at symbol level) ($n_{cs}$)

(2) OC (orthogonal cover at slot level) ($n_{oc}$)

(3) Frequency RB (Resource Block) ($n_{rb}$)

If indexes indicating CS, OC and RB are set to $n_{cs}$, $n_{oc}$, $n_{rb}$, respectively, a representative index $n_r$ may include $n_{cs}$, $n_{oc}$ and $n_{rb}$. In this case, the $n_r$ may meet the condition of '$n_r=(n_{cs}, n_{oc}, n_{rb})$'.

The combination of CQI, PMI, RI, CQI and ACK/NACK may be delivered through the PUCCH format 2/2a/2b. And, Reed Muller (RM) channel coding may be applicable.

For instance, channel coding for UL CQI in LTE system may be described as follows. First of all, bitstreams $\alpha_0$, $\alpha_1$, $\alpha_2$, $\alpha_3$, ..., $\alpha_{A-1}$ may be coded using (20, A) RM code. In this case, $\alpha_0$ and $\alpha_{A-1}$ indicates Most Significant Bit (MSB) and Least Significant Bit (LSB), respectively. In case of an extended cyclic prefix, maximum information bits include 11 bits except a case that QI and ACK/NACK are simultaneously transmitted. After coding has been performed with 20 bits using the RM code, QPSK modulation may be applied. Before the BPSK modulation, coded bits may be scrambled.

Table 12 shows a basic sequence for (20, A) code.

TABLE 12

| i | $M_{i,0}$ | $M_{i,1}$ | $M_{i,2}$ | $M_{i,3}$ | $M_{i,4}$ | $M_{i,5}$ | $M_{i,6}$ | $M_{i,7}$ | $M_{i,8}$ | $M_{i,9}$ | $M_{i,10}$ | $M_{i,11}$ | $M_{i,12}$ |
|---|---|---|---|---|---|---|---|---|---|---|---|---|---|
| 0 | 1 | 1 | 0 | 0 | 0 | 0 | 0 | 0 | 0 | 0 | 1 | 1 | 0 |
| 1 | 1 | 1 | 1 | 0 | 0 | 0 | 0 | 0 | 0 | 1 | 1 | 1 | 0 |
| 2 | 1 | 0 | 0 | 1 | 0 | 0 | 1 | 0 | 1 | 1 | 1 | 1 | 1 |
| 3 | 1 | 0 | 1 | 1 | 0 | 0 | 0 | 0 | 1 | 0 | 1 | 1 | 1 |
| 4 | 1 | 1 | 1 | 1 | 0 | 0 | 0 | 1 | 0 | 0 | 1 | 1 | 1 |
| 5 | 1 | 1 | 0 | 0 | 1 | 0 | 1 | 1 | 1 | 0 | 1 | 1 | 1 |
| 6 | 1 | 0 | 1 | 0 | 1 | 0 | 1 | 0 | 1 | 1 | 1 | 1 | 1 |
| 7 | 1 | 0 | 0 | 1 | 1 | 0 | 1 | 1 | 0 | 1 | 1 | 1 | 1 |
| 8 | 1 | 1 | 0 | 1 | 1 | 0 | 0 | 1 | 0 | 1 | 1 | 1 | 1 |
| 9 | 1 | 0 | 1 | 1 | 1 | 0 | 1 | 0 | 0 | 1 | 1 | 1 | 1 |
| 10 | 1 | 0 | 1 | 0 | 0 | 1 | 1 | 1 | 0 | 1 | 1 | 1 | 1 |
| 11 | 1 | 1 | 1 | 0 | 0 | 1 | 1 | 0 | 1 | 0 | 1 | 1 | 1 |
| 12 | 1 | 0 | 0 | 1 | 0 | 1 | 0 | 1 | 1 | 1 | 1 | 1 | 1 |
| 13 | 1 | 1 | 0 | 1 | 0 | 1 | 0 | 1 | 0 | 1 | 1 | 1 | 1 |
| 14 | 1 | 0 | 0 | 0 | 1 | 1 | 0 | 1 | 0 | 1 | 1 | 0 | 1 |
| 15 | 1 | 1 | 0 | 0 | 1 | 1 | 1 | 1 | 0 | 1 | 1 | 0 | 1 |
| 16 | 1 | 1 | 1 | 0 | 1 | 1 | 0 | 0 | 1 | 0 | 1 | 0 | 1 |
| 17 | 1 | 0 | 0 | 1 | 1 | 1 | 0 | 0 | 1 | 0 | 0 | 1 | 1 |
| 18 | 1 | 1 | 0 | 1 | 1 | 1 | 1 | 1 | 0 | 0 | 0 | 0 | 0 |
| 19 | 1 | 0 | 0 | 0 | 0 | 1 | 1 | 0 | 0 | 0 | 0 | 0 | 0 |

Channel coding bits $b_0$, $b_1$, $b_2$, $b_3$, ..., $b_{B-1}$ may be generated by [Equation 1].

$$b_i = \sum_{n=0}^{A-1} (a_n \cdot M_{i,n}) \bmod 2 \qquad \text{[Equation 3]}$$

In [Equation 3], 'i=0, 1, 2, ..., B−1' is met.

In case of wideband repots, a bandwidth of UCI field for CQI/PMI can be represented as Tables 8 to 10 in the following.

Table 13 shows UCI field for broadband report (single antenna port, transmit diversity) or open loop spatial multiplexing PDSCH CQI feedback.

TABLE 13

| Field | Bandwidth |
|---|---|
| Broadband CQI | 4 |

Table 14 shows UCI field for CQI and PMI feedback in case of wideband reports (closed loop spatial multiplexing PDSCH transmission).

TABLE 14

| Field | Bandwidth | | | |
|---|---|---|---|---|
| | 2 antenna ports | | 4 antenna ports | |
| | rank = 1 | rank = 2 | rank = 1 | Rank > 1 |
| Wideband CQI | 4 | 4 | 4 | 4 |
| Spatial differential CQI | 0 | 3 | 0 | 3 |
| Precoding Matrix Indication | 2 | 1 | 4 | 4 |

Table 15 shows UCI field for RI feedback in case of wideband reports.

TABLE 15

| Field | Bit widths | | |
|---|---|---|---|
| | 2 antenna ports | 4 antenna ports | |
| | | Max. 2 layers | Max. 4 layers |
| Rank Indication | 1 | 1 | 2 |

Figure 12:
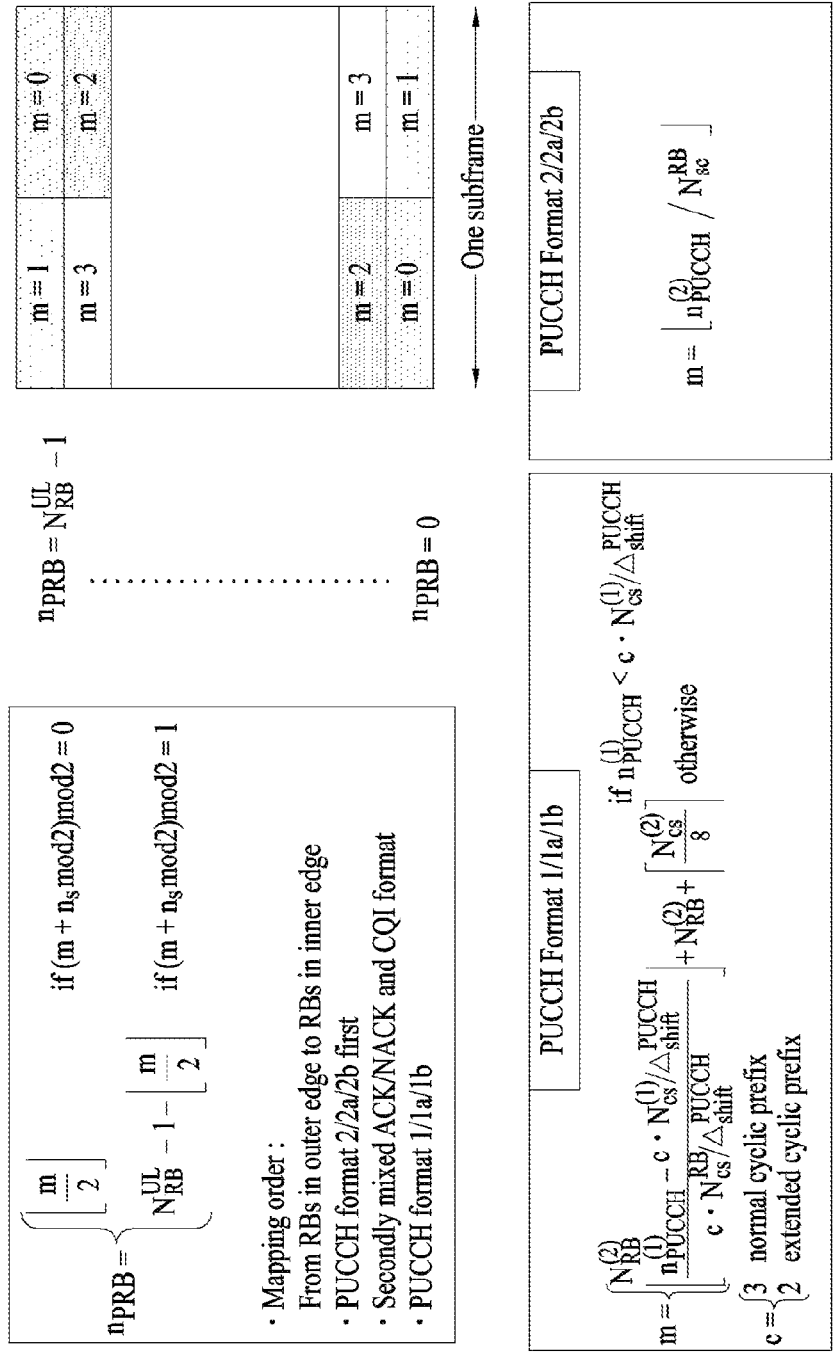
FIG. 12 illustrates allocation of a PRB.
Figure 20:
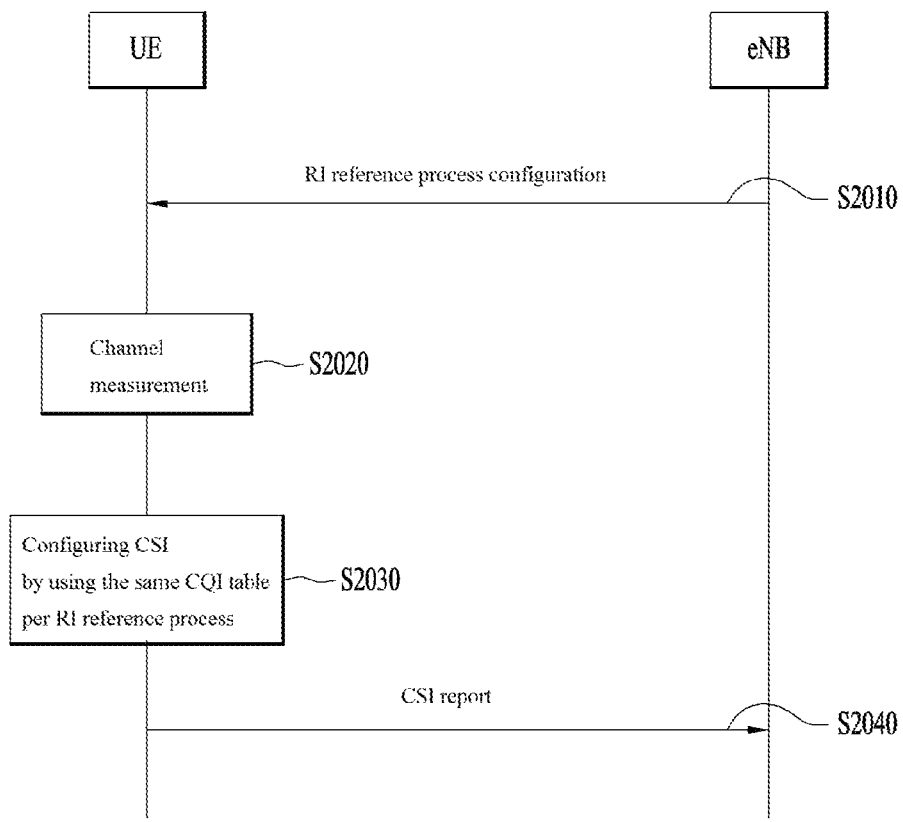
FIG. 20 is a flowchart illustrating one of methods for reporting CSI, in the case where a Rank Indication (RI) reference process is allocated.

FIG. 12 is a diagram for PRB allocation. Referring to FIG. 20, PRB may be usable for PUCCH transmission in a slot $n_s$.

3. Carrier Aggregation (CA) Environment 3.1 CA Overview

A 3GPP LTE system (conforming to Rel-8 or Rel-9) (hereinafter, referred to as an LTE system) uses Multi-Carrier Modulation (MCM) in which a single Component Carrier (CC) is divided into a plurality of bands. In contrast, a 3GPP LTE-A system (hereinafter, referred to an LTE-A system) may use CA by aggregating one or more CCs to support a broader system bandwidth than the LTE system. The term CA is interchangeably used with carrier combining, multi-CC environment, or multi-carrier environment.

In the present disclosure, multi-carrier means CA (or carrier combining). Herein, CA covers aggregation of contiguous carriers and aggregation of non-contiguous carriers. The number of aggregated CCs may be different for a DL and a UL. If the number of DL CCs is equal to the number of UL CCs, this is called symmetric aggregation. If the number of DL CCs is different from the number of UL CCs, this is called asymmetric aggregation. The term CA is interchangeable with carrier combining, bandwidth aggregation, spectrum aggregation, etc.

The LTE-A system aims to support a bandwidth of up to 100 MHz by aggregating two or more CCs, that is, by CA. To guarantee backward compatibility with a legacy IMT system, each of one or more carriers, which has a smaller bandwidth than a target bandwidth, may be limited to a bandwidth used in the legacy system.

For example, the legacy 3GPP LTE system supports bandwidths {1.4, 3, 5, 10, 15, and 20 MHz} and the 3GPP LTE-A system may support a broader bandwidth than 20 MHz using these LTE bandwidths. A CA system of the present disclosure may support CA by defining a new bandwidth irrespective of the bandwidths used in the legacy system.

There are two types of CA, intra-band CA and inter-band CA. Intra-band CA means that a plurality of DL CCs and/or UL CCs are successive or adjacent in frequency. In other words, the carrier frequencies of the DL CCs and/or UL CCs are positioned in the same band. On the other hand, an environment where CCs are far away from each other in frequency may be called inter-band CA. In other words, the carrier frequencies of a plurality of DL CCs and/or UL CCs are positioned in different bands. In this case, a UE may use a plurality of Radio Frequency (RF) ends to conduct communication in a CA environment.

The LTE-A system adopts the concept of cell to manage radio resources. The above-described CA environment may be referred to as a multi-cell environment. A cell is defined as a pair of DL and UL CCs, although the UL resources are not mandatory. Accordingly, a cell may be configured with DL resources alone or DL and UL resources.

For example, if one serving cell is configured for a specific UE, the UE may have one DL CC and one UL CC. If two or more serving cells are configured for the UE, the UE may have as many DL CCs as the number of the serving cells and as many UL CCs as or fewer UL CCs than the number of the serving cells, or vice versa. That is, if a plurality of serving cells are configured for the UE, a CA environment using more UL CCs than DL CCs may also be supported.

CA may be regarded as aggregation of two or more cells having different carrier frequencies (center frequencies). Herein, the term 'cell' should be distinguished from 'cell' as a geographical area covered by an eNB. Hereinafter, intra-band CA is referred to as intra-band multi-cell and inter-band CA is referred to as inter-band multi-cell.

In the LTE-A system, a Primacy Cell (PCell) and a Secondary Cell (SCell) are defined. A PCell and an SCell may be used as serving cells. For a UE in RRC_CONNECTED state, if CA is not configured for the UE or the UE does not support CA, a single serving cell including only a PCell exists for the UE. On the contrary, if the UE is in RRC_CONNECTED state and CA is configured for the UE, one or more serving cells may exist for the UE, including a PCell and one or more SCells.

Serving cells (PCell and SCell) may be configured by an RRC parameter. A physical-layer ID of a cell, PhysCellId is an integer value ranging from 0 to 503. A short ID of an SCell, SCellIndex is an integer value ranging from 1 to 7. A short ID of a serving cell (PCell or SCell), ServeCellIndex is an integer value ranging from 1 to 7. If ServeCellIndex is 0, this indicates a PCell and the values of ServeCellIndex for SCells are pre-assigned. That is, the smallest cell ID (or cell index) of ServeCellIndex indicates a PCell.

A PCell refers to a cell operating in a primary frequency (or a primary CC). A UE may use a PCell for initial connection establishment or connection reestablishment. The PCell may be a cell indicated during handover. In addition, the PCell is a cell responsible for control-related communication among serving cells configured in a CA environment. That is, PUCCH allocation and transmission for the UE may take place only in the PCell. In addition, the UE may use only the PCell in acquiring system information or changing a monitoring procedure. An Evolved Universal Terrestrial Radio Access Network (E-UTRAN) may change only a PCell for a handover procedure by a higher-layer RRCConnectionReconfiguraiton message including mobilityControlInfo to a UE supporting CA.

An SCell may refer to a cell operating in a secondary frequency (or a secondary CC). Although only one PCell is allocated to a specific UE, one or more SCells may be allocated to the UE. An SCell may be configured after RRC connection establishment and may be used to provide additional radio resources. There is no PUCCH in cells other than a PCell, that is, in SCells among serving cells configured in the CA environment.

When the E-UTRAN adds an SCell to a UE supporting CA, the E-UTRAN may transmit all system information related to operations of related cells in RRC_CONNECTED state to the UE by dedicated signaling. Changing system information may be controlled by releasing and adding a related SCell. Herein, a higher-layer RRCConnectionReconfiguration message may be used. The E-UTRAN may transmit a dedicated signal having a different parameter for each cell rather than it broadcasts in a related SCell.

After an initial security activation procedure starts, the E-UTRAN may configure a network including one or more SCells by adding the SCells to a PCell initially configured during a connection establishment procedure. In the CA environment, each of a PCell and an SCell may operate as a CC. Hereinbelow, a Primary CC (PCC) and a PCell may be used in the same meaning and a Secondary CC (SCC) and an SCell may be used in the same meaning in embodiments of the present disclosure.

Figure 13:
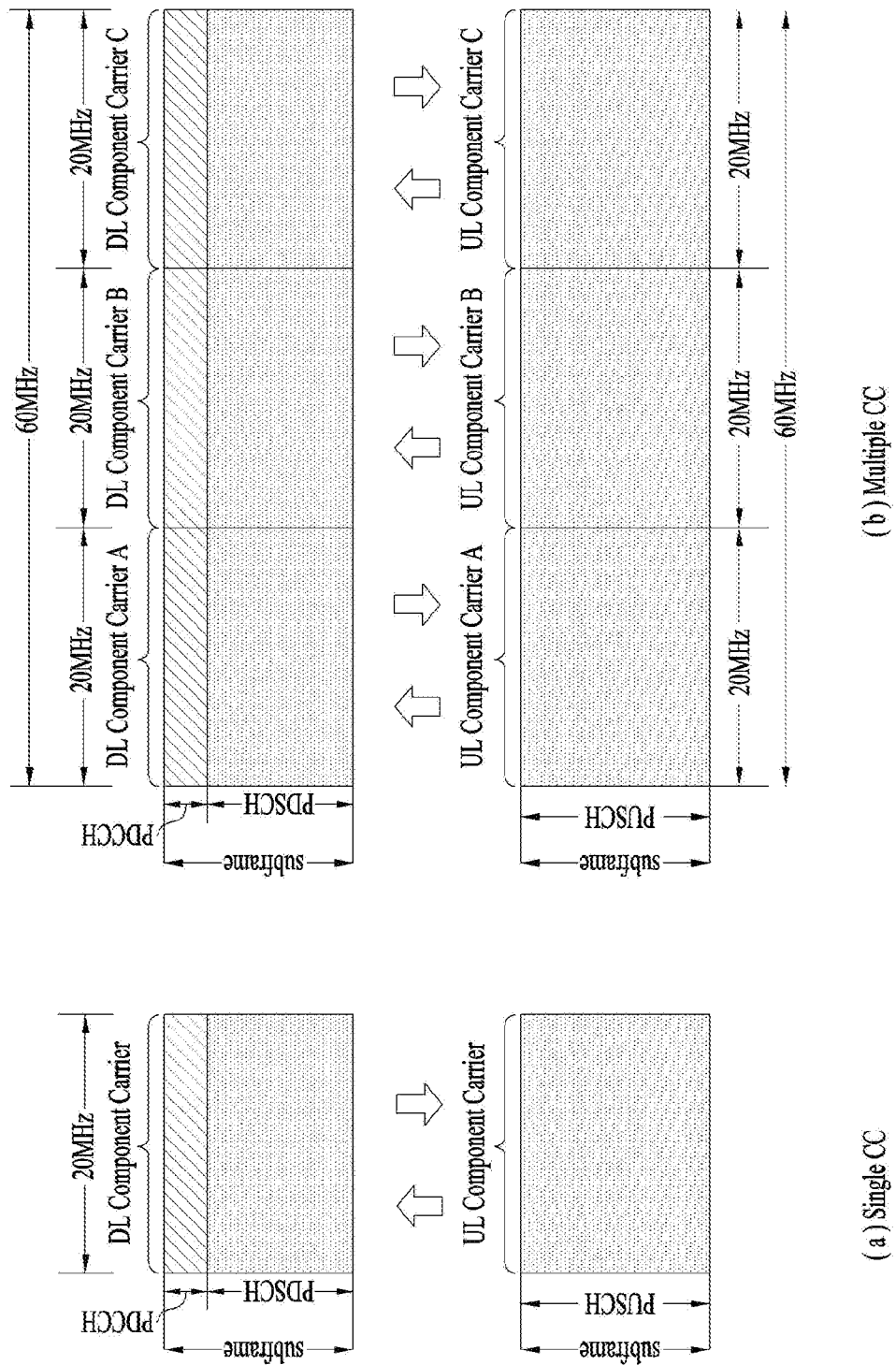
FIG. 13 is a diagram illustrating an example of a Component Carrier (CC) of the embodiments and Carrier Aggregation (CA) used in an LTE-A system.

FIG. 13 illustrates an example of CCs and CA in the LTE-A system, which are used in embodiments of the present disclosure.

FIG. 13(a) illustrates a single carrier structure in the LTE system. There are a DL CC and a UL CC and one CC may have a frequency range of 20 MHz.

FIG. 13(b) illustrates a CA structure in the LTE-A system. In the illustrated case of FIG. 13(b), three CCs each having 20 MHz are aggregated. While three DL CCs and three UL CCs are configured, the numbers of DL CCs and UL CCs are not limited. In CA, a UE may monitor three CCs simultaneously, receive a DL signal/DL data in the three CCs, and transmit a UL signal/UL data in the three CCs.

If a specific cell manages N DL CCs, the network may allocate M (M≤N) DL CCs to a UE. The UE may monitor only the M DL CCs and receive a DL signal in the M DL CCs. The network may prioritize L (L≤M≤N) DL CCs and allocate a main DL CC to the UE. In this case, the UE should monitor the L DL CCs. The same thing may apply to UL transmission.

The linkage between the carrier frequencies of DL resources (or DL CCs) and the carrier frequencies of UL resources (or UL CCs) may be indicated by a higher-layer message such as an RRC message or by system information. For example, a set of DL resources and UL resources may be configured based on linkage indicated by System Information Block Type 2 (SIB2). Specifically, DL-UL linkage may refer to a mapping relationship between a DL CC carrying a PDCCH with a UL grant and a UL CC using the UL grant, or a mapping relationship between a DL CC (or a UL CC) carrying HARQ data and a UL CC (or a DL CC) carrying an HARQ ACK/NACK signal.

3.2 Cross Carrier Scheduling

Two scheduling schemes, self-scheduling and cross carrier scheduling are defined for a CA system, from the perspective of carriers or serving cells. Cross carrier scheduling may be called cross CC scheduling or cross cell scheduling.

In self-scheduling, a PDCCH (carrying a DL grant) and a PDSCH are transmitted in the same DL CC or a PUSCH is transmitted in a UL CC linked to a DL CC in which a PDCCH (carrying a UL grant) is received.

In cross carrier scheduling, a PDCCH (carrying a DL grant) and a PDSCH are transmitted in different DL CCs or a PUSCH is transmitted in a UL CC other than a UL CC linked to a DL CC in which a PDCCH (carrying a UL grant) is received.

Cross carrier scheduling may be activated or deactivated UE-specifically and indicated to each UE semi-statically by higher-layer signaling (e.g. RRC signaling).

If cross carrier scheduling is activated, a Carrier Indicator Field (CIF) is required in a PDCCH to indicate a DL/UL CC in which a PDSCH/PUSCH indicated by the PDCCH is to be transmitted. For example, the PDCCH may allocate PDSCH resources or PUSCH resources to one of a plurality of CCs by the CIF. That is, when a PDCCH of a DL CC allocates PDSCH or PUSCH resources to one of aggregated DL/UL CCs, a CIF is set in the PDCCH. In this case, the DCI formats of LTE Release-8 may be extended according to the CIF. The CIF may be fixed to three bits and the position of the CIF may be fixed irrespective of a DCI format size. In addition, the LTE Release-8 PDCCH structure (the same coding and resource mapping based on the same CCEs) may be reused.

On the other hand, if a PDCCH transmitted in a DL CC allocates PDSCH resources of the same DL CC or allocates PUSCH resources in a single UL CC linked to the DL CC, a CIF is not set in the PDCCH. In this case, the LTE Release-8 PDCCH structure (the same coding and resource mapping based on the same CCEs) may be used.

If cross carrier scheduling is available, a UE needs to monitor a plurality of PDCCHs for DCI in the control region of a monitoring CC according to the transmission mode and/or bandwidth of each CC. Accordingly, an appropriate SS configuration and PDCCH monitoring are needed for the purpose.

In the CA system, a UE DL CC set is a set of DL CCs scheduled for a UE to receive a PDSCH, and a UE UL CC set is a set of UL CCs scheduled for a UE to transmit a PUSCH. A PDCCH monitoring set is a set of one or more DL CCs in which a PDCCH is monitored. The PDCCH monitoring set may be identical to the UE DL CC set or may be a subset of the UE DL CC set. The PDCCH monitoring set may include at least one of the DL CCs of the UE DL CC set. Or the PDCCH monitoring set may be defined irrespective of the UE DL CC set. DL CCs included in the PDCCH monitoring set may be configured to always enable self-scheduling for UL CCs linked to the DL CCs. The UE DL CC set, the UE UL CC set, and the PDCCH monitoring set may be configured UE-specifically, UE group-specifically, or cell-specifically.

If cross carrier scheduling is deactivated, this implies that the PDCCH monitoring set is always identical to the UE DL CC set. In this case, there is no need for signaling the PDCCH monitoring set. However, if cross carrier scheduling is activated, the PDCCH monitoring set may be defined within the UE DL CC set. That is, the eNB transmits a PDCCH only in the PDCCH monitoring set to schedule a PDSCH or PUSCH for the UE.

Figure 14:
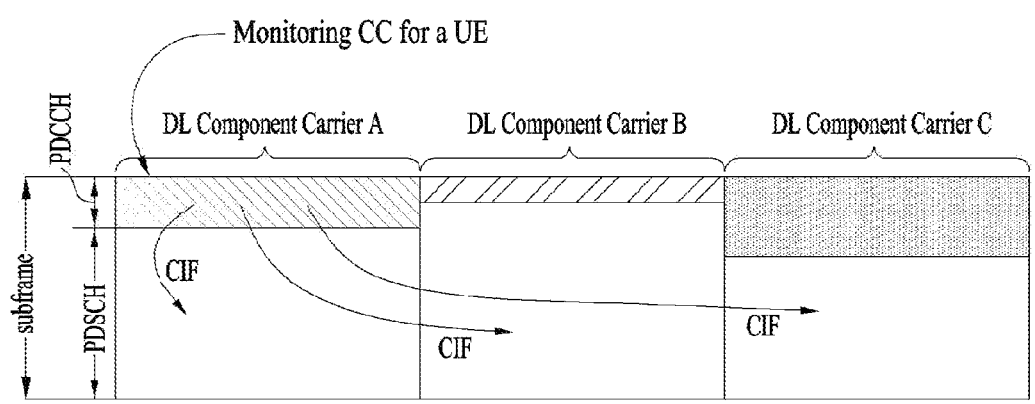
FIG. 14 illustrates a subframe structure of a Long Term Evolution-Advanced (LTE-A) system according to cross-carrier scheduling.

FIG. 14 illustrates a cross carrier-scheduled subframe structure in the LTE-A system, which is used in embodiments of the present disclosure.

Referring to FIG. 14, three DL CCs are aggregated for a DL subframe for LTE-A UEs. DL CC 'A' is configured as a PDCCH monitoring DL CC. If a CIF is not used, each DL CC may deliver a PDCCH that schedules a PDSCH in the same DL CC without a CIF. On the other hand, if the CIF is used by higher-layer signaling, only DL CC 'A' may carry a PDCCH that schedules a PDSCH in the same DL CC 'A' or another CC. Herein, no PDCCH is transmitted in DL CC 'B' and DL CC 'C' that are not configured as PDCCH monitoring DL CCs.

Figure 15:
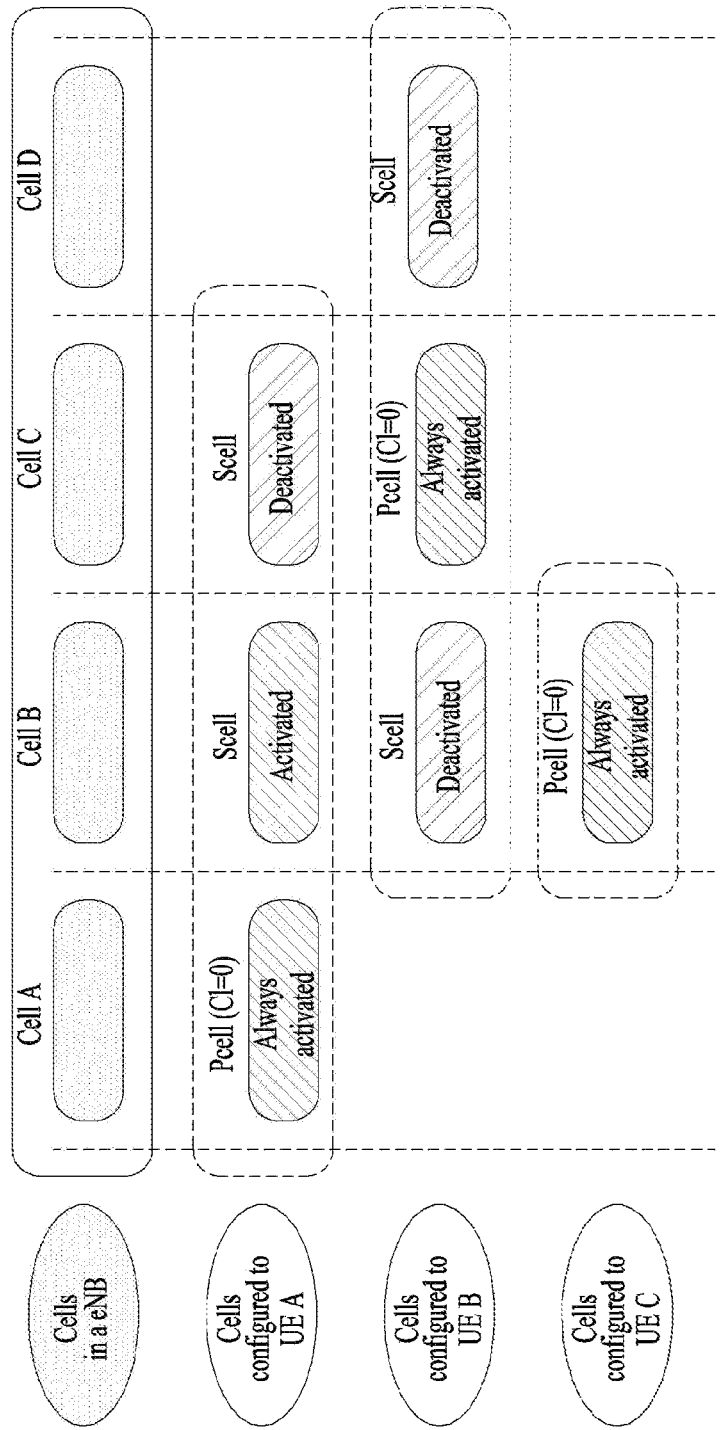
FIG. 15 is conceptual diagram illustrating a construction of serving cells according to cross-carrier scheduling.

FIG. 15 is conceptual diagram illustrating a construction of serving cells according to cross-carrier scheduling.

Referring to FIG. 15, an eNB (or BS) and/or UEs for use in a radio access system supporting carrier aggregation (CA) may include one or more serving cells. In FIG. 8, the eNB can support a total of four serving cells (cells A, B, C and D). It is assumed that UE A may include Cells (A, B, C), UE B may include Cells (B, C, D), and UE C may include Cell B. In this case, at least one of cells of each UE may be composed of P Cell. In this case, P Cell is always activated, and S Cell may be activated or deactivated by the eNB and/or UE.

The cells shown in FIG. 15 may be configured per UE. The above-mentioned cells selected from among cells of the eNB, cell addition may be applied to CA on the basis of a measurement report message received from the UE. The configured cell may reserve resources for ACK/NACK message transmission in association with PDSCH signal transmission. The activated cell is configured to actually transmit a PDSCH signal and/or a PUSCH signal from among the configured cells, and is configured to transmit CSI reporting and Sounding Reference Signal (SRS) transmission. The deactivated cell is configured not to transmit/receive PDSCH/PUSCH signals by an eNB command or a timer operation, and CRS reporting and SRS transmission are interrupted.

3.3 Carrier Aggregation Physical Uplink Control Channel (CA PUCCH)

In a wireless communication system supportive of carrier aggregation, PUCCH format for feeding back UCI (e.g., multi-ACK/NACK bit) can be defined. For clarity of the following description, such PUCCH format shall be named CA PUCCH format.

Figure 16:
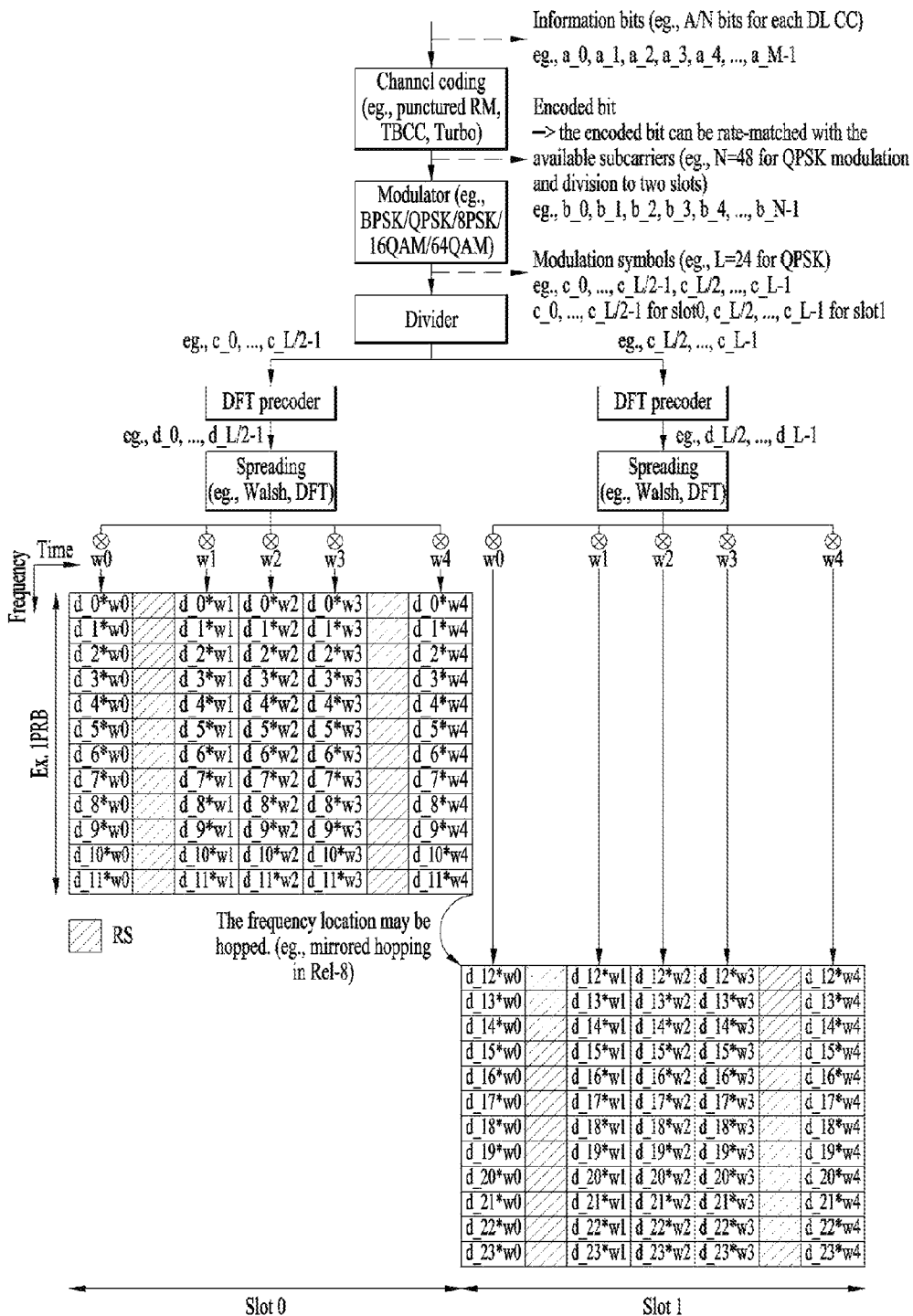
FIG. 16 is a conceptual diagram illustrating CA PUCCH signal processing.

FIG. 16 is a diagram for one example of a signal processing process of CA PUCCH.

Referring to FIG. 16, a channel coding block generates coding bits (e.g., encoded bits, coded bits, etc.) (or codeword) $b\_0, b\_1, \ldots$ and $b\_N-1$ by channel-coding information bits $a\_0, a\_1, \ldots$ and $a\_M-1$ (e.g., multiple ACK/NACK bits). In this case, the M indicates a size of information bits and the N indicates a size of the coding bits. The information bits may include multiple ACK/NACK for UL control information (UCI), e.g., a plurality of data (or PDSCH) received via a plurality of DL CCS. In this case, the information bits $a\_0, a\_1, \ldots a\_M-1$ may be joint-coded irrespective of type/number/size of the UCI configuring the information bits. For instance, in case that information bits include multiple ACK/NACK for a plurality of DL CCs, channel coding may not be performed per DL CC or individual ACK/NACK bit but may be performed on all bit information, from which a single codeword may be generated. And, channel coding is non-limited by this. Moreover, the channel coding may include one of simplex repetition, simplex coding, RM coding, punctured RM coding, Tail-Biting Convolutional Coding (TBCC), Low-Density Parity-Check (LDPC), turbo coding, and the like. Besides, coding bits may be rate-matched in consideration of a modulation order and a resource size (not shown in the drawing). A rate matching function may be included as a part of the channel coding block or may be performed via a separate function block.

A modulator generates modulated symbols $c\_0, c\_1 \ldots c\_L-1$ by modulating coding bits $b\_0, b\_1 \ldots b\_N-1$. In this case, the L indicates a size of modulated symbol. This modulation scheme may be performed in a manner of modifying a size and phase of a transmission signal. For instance, the modulation scheme may include one of n-PSK, n-QAM, and the like, where n is an integer equal to or greater than 2. In particular, the modulation scheme may include one of BPSK, QPSK, 8-PSK, QAM, 16-QAM, 64-QAM, and the like.

A divider divides the modulated symbols $c\_0, c\_1 \ldots c\_L-1$ to slots, respectively. A sequence/pattern/scheme for dividing the modulated symbols to the slots may be specially non-limited. For instance, the divider may be able to divide the modulated symbols to the corresponding slots in order from a head to tail (Localized scheme). In doing so, as shown in the drawing, the modulated symbols $c\_0, c\_1 \ldots c\_L/2-1$ may be divided to the slot 0 and the modulated symbols $c\_L/2, c\_L/2+1 \ldots c\_L-1$ may be divided to the slot 1. Moreover, the modulated symbols may be divided to the corresponding slots, respectively, by interleaving or permutation. For instance, the even-numbered modulated symbol may be divided to the slot 0, while the odd-numbered modulated symbol may be divided to the slot 1. The modulation scheme and the dividing scheme may be switched to each other in order.

A DFT precoder may perform DFT precoding (e.g., 12-point DFT) on the modulated symbols divided to the corresponding slots to generate a single carrier waveform. Referring to the drawing, the modulated symbols $c\_0, c\_1 \ldots c\_L/2-1$ divided to the corresponding slot 0 may be DFT-precoded into DFT symbols $d\_0, d\_1 \ldots d\_L/2-1$, and the modulated symbols $c\_L/2, c\_L/2+1 \ldots c\_L-1$ divided to the slot 1 may be DFT-precoded into DFT symbols $d\_L/2, d\_L/2+1 \ldots d\_L-1$. Moreover, the DFT precoding may be replaced by another linear operation (e.g., Walsh precoding) corresponding thereto.

A spreading block may spread the DFT-performed signal at SC-FDMA symbols level (e.g., time domain). The time-domain spreading at the SC-FDMA level may be performed using a spreading code (sequence). The spreading code may include pseudo orthogonal code and orthogonal code. The pseudo orthogonal code may include Pseudo Noise (PN) code, by which the pseudo orthogonal code may be non-limited. The orthogonal code may include Walsh code and DFT code, by which the orthogonal code may be non-limited. The orthogonal code (OC) may be interchangeably used with one of an orthogonal sequence, an OC and an OCC. In this specification, for example, the orthogonal code may be mainly described as a representative example of the spreading code for clarity and convenience of the following description. Optionally, the orthogonal code may be substituted with the pseudo orthogonal code. A maximum value of a spreading code size (or a Spreading Factor (SF)) may be limited by the number of SC-FDAM symbols used for control information transmission. For example, in case that 5 SC-FDMA symbols are used in one slot for control information transmission, orthogonal codes (or pseudo orthogonal codes) w0, w1, w2, w3 and w4 of length 5 may be used per slot. The SF may mean a spreading degree of the control information and may be associated with a multiplexing order or an antenna multiplexing order of a UE. The SF may be variable like 1, 2, 3, 4, 5 . . . depending on a requirement of a system. The SF may be defined in advance between a base station and a UE. And, the SF may be notified to a UE via DCI or RRC signaling.

The signal generated through the above-described process may be mapped to subcarrier within the PRB and may be then transformed into a time-domain signal through IFFT.

CP may be attached to the time-domain signal. The generated SC-FDMA symbol may be then transmitted through an RF stage.

3.3.1 CSI Feedback on PUCCH

First of all, in the 3GPP LTE system, when a DL reception entity (e.g., a UE) is connected to a DL transmission entity (e.g., a BS), the DL reception entity performs measurement on a Reference Signal Received Power (RSRP) of a reference signal transmitted in DL, a quality of a reference signal Reference Signal Received Quality (RSRQ) and the like at a random time and is then able to make a periodic or even-triggered report of a corresponding measurement result to the base station.

Each UE reports a DL channel information in accordance with a DL channel status via uplink. A base station is then able to determine time/frequency resources, MCS and the like appropriate for a data transmission to each UE using the DL channel information received from the each UE.

Such CSI may include CQI, Precoding Matrix Indicator (PMI), Precoder Type Indication (PTI) and/or Rank Indication (RI). In particular, the CSI may be transmitted entirely or partially depending on a transmission mode of each UE. CQI is determined based on a received signal quality of a UE, which may be generally determined on the basis of a measurement of a DL reference signal. In doing so, a CQI value actually delivered to a base station may correspond to an MCS capable of providing maximum performance by maintaining a Block Error Rate (BLER) under 10% in the received signal quality measured by a UE.

This channel information reporting may be classified into a periodic report transmitted periodically and an aperiodic report transmitted in response to a request made by a base station.

In case of the aperiodic report, it is set for each UE by a 1-bit request bit (CQI request bit) contained in UL scheduling information downloaded to a UE by a base station. Having received this information, each UE is then able to deliver channel information to the base station via a physical uplink shared channel (PUSCH) in consideration of its transmission mode. And, it may set RI and CQI/PMI not to be transmitted on the same PUSCH.

In case of the periodic report, a period for transmitting channel information via an upper layer signal, an offset in the corresponding period and the like are signaled to each UE by subframe unit and channel information in consideration of a transmission mode of each UE may be delivered to a base station via a physical uplink control channel (PUCCH) in accordance with a determined period. In case that data transmitted in uplink simultaneously exists in a subframe in which channel information is transmitted by a determined period, the corresponding channel information may be transmitted together with the data not on the PUCCH but on a PUSCH. In case of the periodic report via PUCCH, bits (e.g., 11 bits) limited further than those of the PUSCH may be used. RI and CQI/PMI may be transmitted on the same PUSCH.

In case that contention occurs between the periodic report and the aperiodic report in the same subframe, only the aperiodic report can be performed.

In calculating Wideband CQI/PMI, a most recently transmitted RI may be usable. RI in a PUCCH CSI report mode is independent from RI in a PUSCH CSI report mode. The RI in the PUSCH CSI report mode is valid for CQI/PMI in the corresponding PUSCH CSI report mode only.

Table 16 is provided to describe CSI feedback type transmitted on PUCCH and PUCCH CSI report mode.

TABLE 16

| | | PMI Feedback Type | |
|---|---|---|---|
| | | No PMI (OL, TD, single-antenna) | Single PMI (CL) |
| CQI Feedback Type | Wideband | Mode 1-0<br>RI (only for Open-Loop SM)<br>One Wideband CQI (4 bit)<br>when RI > 1, CQI of first codeword | Mode 1-1<br>RI<br>Wideband CQI (4 bit)<br>Wideband spatial CQI (3 bit) for RI > 1<br>Wideband PMI (4 bit) |
| | UE Selected | Mode 2-0<br>RI (only for Open-Loop SM)<br>Wideband CQI (4 bit)<br>Best-1 CQI (4 bit) in each BP<br>Best-1 indicator(L-bit label)<br>when RI > 1, CQI of first codeword | Mode 2-1<br>RI<br>Wideband CQI (4 bit)<br>Wideband spatial CQI (3 bit) for RI > 1<br>Wideband PMI (4 bit)<br>Best-1 CQI (4 bit) 1 in each BP<br>Best-1 spatial CQI (3 bit) for RI > 1<br>Best-1 indicator (L-bit label) |

Referring to Table 16, in the periodic report of channel information, there are 4 kinds of reporting modes (mode 1-0, mode 1-2, mode 2-0 and mode 2-1) in accordance with CQI and PMI feedback types.

CQI can be classified into Wideband (WB) CQI and Subband (SB) CQI in accordance with CQI feedback type and PMI can be classified into No PMI or Single PMI in accordance with a presence or non-presence of PMI transmission. In Table 11, No PMI corresponds to a case of Open-Loop (OL), Transmit Diversity (TD) and single-antenna, while Single PMI corresponds to a case of Closed-Loop (CL).

The mode 1-0 corresponds to a case that WB CQI is transmitted in the absence of PMI transmission. In this case, RI is transmitted only in case of OL Spatial Multiplexing (SM) and one WB CQI represented as 4 bits can be transmitted. If RI is greater than 1, CQI for a $1^{st}$ codeword can be transmitted.

The mode 1-1 corresponds to a case that a single PMI and WB CQI are transmitted. In this case, 4-bit WB CQI and 4-bit WB PMI can be transmitted together with RI transmission. Additionally, if RI is greater than 1, 3-bit WB spatial differential CQI can be transmitted. In 2-codeword transmission, the WB spatial differential CQI may indicate a difference value between a WB CQI index for codeword 1 and a WB CQI index for codeword 2. The difference value in-between may have a value selected from a set $\{-4, -3, -2, -1, 0, 1, 2, 3\}$ and can be represented as 3 bits.

The mode 2-0 corresponds to a case that CQI on a UE-selected band is transmitted in the absence of PMI transmission. In this case, RI is transmitted only in case of OL SM and a WB CQI represented as 4 bits may be transmitted. A best CQI (best-1) is transmitted on each Bandwidth Part (BP) and the best-1 CQI may be represented as 4 bits. And, an L-bit indicator indicating the best-1 may be transmitted together. If the RI is greater than 1, a CQI for a $1^{st}$ codeword can be transmitted.

And, the mode 2-1 corresponds to a case that a single PMI and a CQI on a UE-selected band are transmitted. In this case, together with RI transmission, 4-bit WB CQI, 3-bit WB spiral differential CQI and 4-bit WB PMI can be transmitted. Additionally, 4-bit best-1 CQI is transmitted on each BP and L-bit best-1 indicator can be transmitted together. Additionally, if RI is greater than 1, 3-bit best-1 spatial differential CQI can be transmitted. In 2-codeword transmission, it may indicate a difference value between a best-1 CQI index of codeword 1 and a best-1 CQI index of codeword 2.

For the transmission modes, periodic PUCCH CSI report modes are supported as follows.
1) Transmission mode 1: Modes 1-0 and 2-0
2) Transmission mode 2: Modes 1-0 and 2-0
3) Transmission mode 3: Modes 1-0 and 2-0
4) Transmission mode 4: Modes 1-1 and 2-1
5) Transmission mode 5: Modes 1-1 and 2-1
6) Transmission mode 6: Modes 1-1 and 2-1
7) Transmission mode 7: Modes 1-0 and 2-0
8) Transmission mode 8: Modes 1-1 and 2-1 if a UE is set to make a PMI/RI reporting, or Modes 1-0 and 2-0 if a UE is set not to make a PMI/RI reporting
9) Transmission mode 9: Modes 1-1 and 2-1 if a UE is set to make a PMI/RI reporting and the number of CSI-RS ports is greater than 1, or Modes 1-0 and 2-0 if a UE is set not to make a PMI/RI reporting and the number of CSI-RS port(s) is equal to 1.

The periodic PUCCH CSIU reporting mode in each serving cell is set by upper layer signaling. And, the mode 1-1 is set to either submode 1 or submode 2 by an upper layer signaling using a parameter 'PUCCH_format1-1_CSI_reporting_mode'.

A CQI reporting in a specific subframe of a specific serving cell in a UE-selected SB CQI means a measurement of at least one channel state of a BP corresponding to a portion of a bandwidth of a serving cell. An index is given to the bandwidth part in a frequency increasing order starting with a lowest frequency without an increment of a bandwidth.

$N_{RB}^{DL}$ Indicates the number of RBs of a serving cell system bandwidth. The system bandwidth may be divided into N (1, 2, 3, . . . N) SB CQI subbands. One SB CQI may include k RBs defined in Table 15. If the number of RBs of the whole bandwidth is not a multiple integer of k ($\lfloor N_{RB}^{DL}/k \rfloor - \lfloor N_{RB}^{DL}/k \rfloor > 0$), the number of RBs configuring a last (i.e., $N^{th}$) SB CQI may be determined by [Equation 4].

$$N_{RB}^{DL} - k \cdot \lfloor N_{RB}^{DL}/k \rfloor \qquad \text{[Equation 4]}$$

Table 17 shows relationship among subband size k, BP and system bandwidth $N_{RB}^{DL}$.

TABLE 17

| System Bandwidth $N_{RB}^{DL}$ | Subband Size k (RBs) | Bandwidth Parts (J) |
|---|---|---|
| 6-7 | NA | NA |
| 8-10 | 4 | 1 |
| 11-26 | 4 | 2 |
| 27-63 | 6 | 3 |
| 64-110 | 8 | 4 |

Moreover, $N_J$ CQI subbands configure one bandwidth part (BP) and a system bandwidth can be divided into J BPs. If J=1, $N_J$ is equal to $\lceil N_{RB}^{DL}/k/J \rceil$. If J>1, $N_J$ is equal to $\lceil N_{RB}^{DL}/k/J \rceil$ or $\lceil N_{RB}^{DL}/k/J \rceil - 1$. A UE calculates a CQI index for a preferred best one (best-1) CQI band in BP and may then be able to transmit the CQI index on PUCCH. In doing so, a best-1 indicator indicating what is the best-1 CQI subband selected from one BP may be transmitted together. The best-1 indicator may be configured with L bits, where the 'L' can be represented as [Equation 5].

$$L = \lceil \log_2 [N_{RB}^{DL}/k/J] \rceil \qquad \text{[Equation 5]}$$

In the above UE-selected CQI reporting mode, it is able to determine a frequency band in which a CQI index is calculated.

In the following description, a CQI transmission period is explained.

Table 18 shows CQI and PMI payload sizes of each PUCCH CSI report mode.

TABLE 18

| PUCCH Format | Reported | Mode State | PUCCH Reporting Modes | | | |
|---|---|---|---|---|---|---|
| | | | Mode 1-1 (bits/BP) | Mode 2-1 (bits/BP) | Mode 1-0 (bits/BP) | Mode 2-0 (bits/BP) |
| 1 | Sub-band CQI | RI = 1 | NA | 4 + L | NA | 4 + L |
| | | RI > 1 | NA | 7 + L | NA | 4 + L |
| 1a | Sub-band CQI/second PMI | 8 antenna ports RI = 1 | NA | 8 + L | NA | NA |
| | | 8 antenna ports 1 < RI < 5 | NA | 9 + L | NA | NA |
| | | 8 antenna ports RI > 4 | NA | 7 + L | NA | NA |
| 2 | Wideband CQI/PMI | 2 antenna ports RI = 1 | 6 | 6 | NA | NA |
| | | 4 antenna ports RI = 1 | 8 | 8 | NA | NA |
| | | 2 antenna ports RI > 1 | 8 | 8 | NA | NA |
| | | 4 antenna ports RI > 1 | 11 | 11 | NA | NA |
| 2a | Wideband first PMI | 8 antenna ports RI < 3 | NA | 4 | NA | NA |
| | | 8 antenna ports 2 < RI < 8 | NA | 2 | NA | NA |
| | | 8 antenna ports RI = 8 | NA | 0 | NA | NA |
| 2b | Wideband CQI/second PMI | 8 antenna ports RI = 1 | 8 | 8 | NA | NA |
| | | 8 antenna ports 1 < RI < 4 | 11 | 11 | NA | NA |
| | | 8 antenna ports RI = 4 | 10 | 10 | NA | NA |
| | | 8 antenna ports RI > 4 | 7 | 7 | NA | NA |
| 2c | Wideband CQI/first PMI/second PMI | 8 antenna ports RI = 1 | 8 | — | NA | NA |
| | | 8 antenna ports 1 < RI ≤ 4 | 11 | — | NA | NA |
| | | 8 antenna ports 4 < RI ≤ 7 | 9 | — | NA | NA |
| | | 8 antenna ports RI = 8 | 7 | — | NA | NA |
| 3 | RI | 2-layer spatial multiplexing | 1 | 1 | 1 | 1 |
| | | 4-layer spatial multiplexing | 2 | 2 | 2 | 2 |
| | | 8-layer spatial multiplexing | 3 | 3 | NA | NA |
| 4 | Wideband CQI | RI = 1 or RI > 1 | NA | NA | 4 | 4 |

TABLE 18-continued

| PUCCH Format | Reported | Mode State | Mode 1-1 (bits/BP) | Mode 2-1 (bits/BP) | Mode 1-0 (bits/BP) | Mode 2-0 (bits/BP) |
|---|---|---|---|---|---|---|
| | | | PUCCH Reporting Modes | | | |
| 5 | RI/first PMI | 8 antenna ports, 2-layer spatial multiplexing | 4 | NA | NA | NA |
| | | 8 antenna ports, 4 and 8-layer spatial multiplexing | 5 | | | |
| 6 | RI/PTI | 8 antenna ports, 2-layer spatial multiplexing | NA | 2 | NA | NA |
| | | 8 antenna ports, 4-layer spatial multiplexing | NA | 3 | NA | NA |
| | | 8 antenna ports, 8-layer spatial multiplexing | NA | 4 | NA | NA |

Referring to Table 18, each CQI/PMI and RI reporting type (PUCCH reporting type) supported for PUCCH CSI report mode can be described as follows.

Reporting Type 1 supports CQI feedback for a subband selected by a UE.

Reporting Type 1a supports subband CQI and $2^{nd}$ PMI feedback.

Reporting Type 2/2b/2c supports WB CQI and PMI feedback.

Reporting Type 2a supports WB PMI feedback.

Reporting Type 3 supports RI feedback.

Reporting Type 4 supports WB CQI.

Reporting Type 5 supports RI and WB PMI feedback.

Reporting Type 6 supports RI and PTI feedback.

A UE can receive information including a combination of a transmission period of channel information and an offset from an upper layer by RRC signaling. The UE can transmit the channel information to a base station based on the provided information on the channel information transmission period. In each serving cell, a period $N_{pd}$ in a subframe for a CQI/PMI reporting and an offset $N_{OFFSET,CQI}$ in the subframe are determined based on a parameter 'cqi-pmi-ConfigIndex' ($I_{CQI/PMI}$) set up by upper layer signaling [cf. Table 14 and Table 15]. An offset $N_{OFFSET,RI}$ related to a period $M_{RI}$ for an RI reporting is determined based on a parameter 'ri-ConfigIndex' ($I_{RI}$) [cf. Table 16]. The offset NOFFSET,RI for the RI reporting has a value of {0, −1 . . . −($N_{pd−1}$)} In case that a UE is set to report abnormality of one CSI subframe set, the 'cqi-pmi-ConfigIndex' and the 'ri-ConfigIndex' correspond to the period and offset of CQI/PMI and RI for a subframe set 1, respectively. And, the 'cqi-pmi-ConfigIndex2' and the 'ri-ConfigIndex2' correspond to the period and offset of CQI/PMI and RI for a subframe set 2, respectively.

Table 19 shows the mapping relation between $N_{pd}$ and $N_{OFFSET,CQI}$ of a parameter ICQI/PMI in FDD.

TABLE 19

| $I_{CQI/PMI}$ | Value of $N_{pd}$ | Value of $N_{OFFSET, CQI}$ |
|---|---|---|
| 0 ≤ $I_{CQI/PMI}$ ≤ 1 | 2 | $I_{CQI/PMI}$ |
| 2 ≤ $I_{CQI/PMI}$ ≤ 6 | 5 | $I_{CQI/PMI}$ − 2 |
| 7 ≤ $I_{CQI/PMI}$ ≤ 16 | 10 | $I_{CQI/PMI}$ − 7 |
| 17 ≤ $I_{CQI/PMI}$ ≤ 36 | 20 | $I_{CQI/PMI}$ − 17 |
| 37 ≤ $I_{CQI/PMI}$ ≤ 76 | 40 | $I_{CQI/PMI}$ − 37 |
| 77 ≤ $I_{CQI/PMI}$ ≤ 156 | 80 | $I_{CQI/PMI}$ − 77 |

TABLE 19-continued

| $I_{CQI/PMI}$ | Value of $N_{pd}$ | Value of $N_{OFFSET, CQI}$ |
|---|---|---|
| 157 ≤ $I_{CQI/PMI}$ ≤ 316 | 160 | $I_{CQI/PMI}$ − 157 |
| $I_{CQI/PMI}$ = 317 | | Reserved |
| 318 ≤ $I_{CQI/PMI}$ ≤ 349 | 32 | $I_{CQI/PMI}$ − 318 |
| 350 ≤ $I_{CQI/PMI}$ ≤ 413 | 64 | $I_{CQI/PMI}$ − 350 |
| 414 ≤ $I_{CQI/PMI}$ ≤ 541 | 128 | $I_{CQI/PMI}$ − 414 |
| 542 ≤ $I_{CQI/PMI}$ ≤ 1023 | | Reserved |

Table 20 shows the mapping relation between $N_{pd}$ and $N_{OFFSET,CQI}$ of a parameter ICQI/PMI in TDD.

TABLE 20

| $I_{CQI/PMI}$ | Value of $N_{pd}$ | Value of $N_{OFFSET, CQI}$ |
|---|---|---|
| $I_{CQI/PMI}$ = 0 | 1 | $I_{CQI/PMI}$ |
| 1 ≤ $I_{CQI/PMI}$ ≤ 5 | 5 | $I_{CQI/PMI}$ − 1 |
| 6 ≤ $I_{CQI/PMI}$ ≤ 15 | 10 | $I_{CQI/PMI}$ − 6 |
| 16 ≤ $I_{CQI/PMI}$ ≤ 35 | 20 | $I_{CQI/PMI}$ − 16 |
| 36 ≤ $I_{CQI/PMI}$ ≤ 75 | 40 | $I_{CQI/PMI}$ − 36 |
| 76 ≤ $I_{CQI/PMI}$ ≤ 155 | 80 | $I_{CQI/PMI}$ − 76 |
| 156 ≤ $I_{CQI/PMI}$ ≤ 315 | 160 | $I_{CQI/PMI}$ − 156 |
| 316 ≤ $I_{CQI/PMI}$ ≤ 1023 | | Reserved |

Table 21 shows the mapping relation between $M_{RI}$ and $N_{OFFSET,RI}$ of a parameter $I_{RI}$ in TDD.

TABLE 21

| $I_{RI}$ | Value of $M_{RI}$ | Value of $N_{OFFSET, RI}$ |
|---|---|---|
| 0 ≤ $I_{RI}$ ≤ 160 | 1 | −$I_{RI}$ |
| 161 ≤ $I_{RI}$ ≤ 321 | 2 | −($I_{RI}$ − 161) |
| 322 ≤ $I_{RI}$ ≤ 482 | 4 | −($I_{RI}$ − 322) |
| 483 ≤ $I_{RI}$ ≤ 643 | 8 | −($I_{RI}$ − 483) |
| 644 ≤ $I_{RI}$ ≤ 804 | 16 | −($I_{RI}$ − 644) |
| 805 ≤ $I_{RI}$ ≤ 965 | 32 | −($I_{RI}$ − 805) |
| 966 ≤ $I_{RI}$ ≤ 1023 | | Reserved |

3.3.1.1 WB CQI/PMI Reporting

A subframe for WB CQI/PMI reporting meets [Equation 6] in the following.

$$(10 \times n_f + \lfloor n_s/2 \rfloor - N_{OFFSET,CQI}) \mod (N_{pd}) = 0 \quad \text{[Equation 6]}$$

In an RI reporting is set up, a reporting interval of the RI reporting is equal to an integer multiple $M_{RI}$ of a period $N_{pd}$ in a subframe. The subframe for the RI reporting meets [Equation 7] in the following.

$$(10 \times n_f + \lfloor n_s/2 \rfloor - N_{OFFSET,CQI} - N_{OFFSET,RI}) \bmod (N_{pd} \cdot M_{RI}) = 0 \quad \text{[Equation 7]}$$

3.3.1.2 WB CQI/PMI Reporting and SB CQI Reporting

If both a WB CQI/PMI reporting and an SB CQI reporting are set up, a subframe for the WB CQI/PMI reporting and the SB CQI reporting meets [Equation 8] in the following.

$$(10 \times n_f + \lfloor n_s/2 \rfloor - N_{OFFSET,CQI}) \bmod N_{pd} = 0 \quad \text{[Equation 8]}$$

If a PTI is not transmitted or a most recently transmitted PTI is equal to 1, a WB CQI/WB PMI (or WB CQI/WB $2^{nd}$ PMI in transmission mode 9) reporting has a period of $H \cdot N_{pd}$ and a subframe meets [Equation 9] in the following.

$$(10 \times n_f + \lfloor n_s/2 \rfloor - N_{OFFSET,CQI}) \bmod (H \cdot N_{pd}) = 0 \quad \text{[Equation 9]}$$

In [Equation 9], H meets 'H=J·K+1' and J indicates the number of BP(s).

Between two consecutive WB CQI/WB PMI (or WB CQI/WB $2^{nd}$ PMI in transmission mode 9) reporting, a J·K reporting uses a sequence for an SB CQI reporting having full cycles K of BP except a case that an interval between the two consecutive WB CQI/WB PMI is smaller than the J·K reporting due to 0 of a system frame number transmission. In this case, a UE may not report SB CQI that is not transmitted before the $2^{nd}$ of the two WB CQI/WB PMI (or WB CQI/WB $2^{nd}$ PMI in transmission mode 9). The full cycles of each BP has an order increasing from $0^{th}$ BP to $(J-1)^{th}$ BP and the parameter K may be set by upper layer signaling.

On the other hand, if the most recently transmitted PTI is equal to 0, a $1^{st}$ WB PMI has a period $H' \cdot N_{pd}$ and a subframe meets [Equation 10] in the following.

$$(10 \times n_f + \lfloor n_s/2 \rfloor - N_{OFFSET,CQI}) \bmod (H' \cdot N_{pd}) = 0 \quad \text{[Equation 10]}$$

In [Equation 10], H' is signaled by an upper layer.

A reporting remaining between two consecutive $1^{st}$ WB PMI reporting can use a $2^{nd}$ WB PMI in WB CQI.

If an RI reporting is set up, a reporting interval of RI is MRI times greater than the WB CQI/PMI period $H \cdot N_{pd}$. The RI is reported through the same PUCCH cyclic shift resource of the WB CQI/PMI and SB CQI reporting and a subframe for the RI reporting meets [Equation 11] in the following.

$$(10 \times n_f + \lfloor n_s/2 \rfloor - N_{OFFSET,CQI} - N_{OFFSET,RI}) \bmod (H \cdot N_{pd} \cdot M_{RI}) = 0 \quad \text{[Equation 11]}$$

Meanwhile, in case that contention occurs between a CSI report having PUCCH reporting type 3, 5 or 6 for one serving cell and a CSI report having PUCCH reporting type 1, 1a, 2, 2a, 2b, 2c or 4 for the same serving cell, the CSI report having a PUCCH reporting type (e.g., 1, 1a, 2, 2a, 2b, 2c and 4) of a low priority is dropped.

In case that at least one serving cell is configured for a UE, the UE transmits a CSI report for only one serving cell in a determined subframe. In the determined subframe, if contention occurs between a CSI report having PUCCH reporting type 3, 5, 6 or 2a for one serving cell and a CSI report having PUCCH reporting type 1, 1a, 2, 2b, 2c or 4 of another serving cell, the CSI report having the PUCCH reporting type (e.g., 1, 1a, 2, 2b, 2c and 4) of a low priority is dropped. Moreover, in the determined subframe, if contention occurs between a CSI report having PUCCH reporting type 2, 2b, 2c or 4 for one serving cell and a CSI report having PUCCH reporting type 1 or 1a of another serving cell, the CSI report having the PUCCH reporting type (e.g., 1 and 1a) of a low priority is dropped.

In the determined subframe, if contention occurs between CSI reports for different serving cells having a PUCCH reporting type of the same priority, a CSI for the serving cell having the lowest 'ServCellIndex' is reported and the CSI report for the rest of serving cells is dropped.

The following describes the UE's operation and the PUCCH format allocation when the CSI is collided with HARQ-ACK/NACK.

A CSI report of a determined PUCCH reporting type can be transmitted through PUCCH resource $n_{PUCCH}^{(2,p)}$. In this case, $n_{PUCCH}^{(2,p)}$ is configured UE-specifically and is configured for each cell by upper layer signaling. If contention occurs between a CSI and an active SR in the same subframe, the CSI is dropped.

In a TDD periodic CQI/PMI reporting, a period value is applied in accordance with TDD UL/DL configuration as follows.

First of all, a reporting period '$N_{pd}=1$' is applied to TDD UL/DL configurations 0, 1, 3, 4 and 6 only. In this case, all UL subframes of a radio frame are used for the CQI/PMI reporting.

A reporting period '$N_{pd}=5$' is applied to TDD UL/DL configurations 0, 1, 2 and 6 only.

A reporting period '$N_{pd}=\{10, 20, 40, 80, 160\}$' is applicable to all TDD UL/DL configurations.

In a serving cell having $N_{RB}^{DL} \leq 7$, Mode 2-0 and Mode 2-1 are not supported.

Table 22 shows a subsampling codebook of PUCCH mode 1-1 submode 2. In this case, $i_1$ indicates a $1^{st}$ PMI and $i_2$ indicates a $2^{nd}$ PMI.

TABLE 22

| RI | $i_1$ | | $i_2$ | | total |
|---|---|---|---|---|---|
| | #bits | values | #bits | values | #bits |
| 1 | 3 | {0, 2, 4, 6, 8, 10, 12, 14}, | 1 | {0, 2} | 4 |
| 2 | 3 | {0, 2, 4, 6, 8, 10, 12, 14} | 1 | {0, 1} | 4 |
| 3 | 1 | {0, 2} | 3 | {0, 1, 2, 3, 8, 9, 10, 11} | 4 |
| 4 | 1 | {0, 1} | 3 | {0, 1, 2, 3, 4, 5, 6, 7} | 4 |
| 5 | 2 | {0, 1, 2, 3} | 0 | {0} | 2 |
| 6 | 2 | {0, 1, 2, 3} | 0 | {0} | 2 |
| 7 | 2 | {0, 1, 2, 3} | 0 | {0} | 2 |
| 8 | 0 | {0} | 0 | {0} | 0 |

Table 23 shows a joint encoding of PUCCH mode 1-1 submode 1. In this case, $i_1$ indicates a $1^{st}$ PMI.

TABLE 23

| hypotheses | RI | $i_1$ values |
|---|---|---|
| 0-7 | 1 | {0, 2, 4, 6, 8, 12, 14} |
| 8-15 | 2 | {0, 2, 4, 6, 8, 12, 14} |
| 16-17 | 3 | {0, 2} |
| 18-19 | 4 | {0, 2} |
| 20-21 | 5 | {0, 2} |
| 22-23 | 6 | {0, 2} |
| 24-25 | 7 | {0, 2} |
| 26 | 8 | {0} |
| 27-31 | reserved | NA |

Table 24 shows a subsampling codebook of PUCCH mode 2-1. In this case, i2 indicates a 2nd PMI.

TABLE 24

| RI | #bits | $i_2$ values |
|---|---|---|
| 1 | 4 | No subsampling |
| 2 | 2 | {0, 2, 4, 6} |
| 3 | 2 | {2, 3, 10, 11} |
| 4 | 2 | {0, 2, 4, 6} |
| 5 | 0 | {0} |
| 6 | 0 | {0} |
| 7 | 0 | {0} |
| 8 | 0 | {0} |

An RI reporting for a serving cell in periodic report mode is valid for the CQI/PMI reporting for the serving cell in periodic CSI report mode.

CQI/PMI calculation is performed conditionally for a lowest possible RI given by a bitmap parameter 'codebook-SubsetRestriction' if it is conditioned for a last reported RI or there is no last reported RI. If a reporting for at least one CSI subframe set is configured, CQI/PMI is calculated conditionally for a last reported RI linked to the same subframe of a CQI/PMI reporting.

3.3.1.3 Wideband Feedback

1) Mode 1-0

Looking into an RI reported subframe (transmitted in transmission mode 3 only), a UE determines an RI on the assumption of a subband set (S) transmission and then makes a report of a reporting type 3 including one RI.

Looking into a CQI reported subframe, a UE makes a report of a reporting type 4 including one WB CQI value calculated on the assumption of a subband set (S). In transmission mode 3, a CQI is calculated conditionally for a last reported periodic RI. In another transmission mode, a CQI is calculated conditionally for a rank 1 transmission.

2) Mode 1-1

Looking into an RI reported subframe (transmitted in transmission mode 4, 8 or 9 only), a UE determines an RI on the assumption of a subband set (S) transmission and then makes a report of a reporting type 3 including one RI.

Looking into a subframe in which an RI and a 1st PMI are reported (transmitted only if a CSI-RS port is configured in submode 1 of transmission mode 9), a UE determines an RI on the assumption of a subband set (S) transmission and then makes a report of a reporting type 5 including the RI and the 1st PMI, which are joint encoded in accordance with a single precoding matrix selected from a codebook subset on the assumption of the subband set (S) transmission.

Looking into a CQI/PMI reported subframe, a single precoding matrix is selected from a codebook subset on the assumption of a subband set (S) transmission. And a UE can makes a report of type 2/2b/2c. In doing so, a single WB CQI value, which is calculated on the assumption of the subband set (S) transmission and a use of a single precoding matrix in every subband, is included. Moreover, in case of a transmission mode 4 or a transmission mode 8, a UE can make a report of a type 2 configured with a selected single 2nd PMI. In case of a submode 1 of a transmission mode 9, a UE can make a report of a type 2b configured with a selected single 1st PMI. In case of a submode 2 of a transmission mode 9, a UE can make a report of a type 2c configured with 1st and 2nd PMIs in accordance with a single selected precoding matrix. If RI>1, a WB CQI having a 3-bit spatial difference can be reported.

In transmission mode 4, 8 or 9, PMI and CQI are calculated conditionally for a last reported periodic RI. In case of another transmission mode, they are calculated conditionally for a rank 1 transmission.

3.3.1.4 UE Selected Subband Feedback

1) Mode 2-0

Looking into an RI reported subframe (transmitted in transmission mode 3 only), a UE determines an RI on the assumption of a subband set (S) transmission and then makes a report of a reporting type 3 including one RI.

Looking into a WB CQI reported subframe, a UE makes a report of a reporting type 4 including one WB CQI value calculated on the assumption of a subband set (S). In transmission mode 3, a CQI is calculated conditionally for a last reported periodic RI. In another transmission mode, a CQI is calculated conditionally for a rank 1 transmission.

Looking into an SB CQI reported subframe, a UE selects a preferred optimal one (Best-1) from J BPs configured with Nj subband sets [cf. Table 15] and is then able to make a report of a reporting type 1 including one CQI value that reflects a selected subband transmission of the BP determined in accordance with a preferred subband indicator L. A reporting type 1 for each BP may be alternately reported. If RI>1, a CQI indicates a channel quality of a 1st codeword. A preferred subband selection in transmission mode 3 and a CQI value are calculated conditionally for a last reported periodic RI. In another transmission mode, a CQI is calculated conditionally for a rank 1 transmission.

2) Mode 2-1

Looking into an RI reported subframe (transmitted only if the number of configured CSI-RS ports is 2 or 4 in transmission mode 4, 8 or 9), a UE determines an RI on the assumption of a subband set (S) transmission and then makes a report of a reporting type 3 including one RI.

Looking into a subframe, in which an RI is reported in transmission mode 9 when the number of CSI-RS ports is 8, a UE determines an RI on the assumption of a subband set (S) transmission, determines a Precoder Type Indicator (PTI), and then makes a report of a report type 6 including one RI and PTI.

Looking into a WB CQI/PMI reported subframe, a single precoding matrix is selected from a codebook subset on the assumption of a subband set (S) transmission. Except a transmission mode 9, a UE can make a report of a type 2. In doing so, a single WB CQI value, which is calculated on the assumption of the subband set (S) transmission and a use of a single precoding matrix in every subband, and a single selected PMI are included. Moreover, if RI>1, a WB CQI having a 3-bit spatial difference can be reported.

In case of a transmission mode 9, a UE can make a report of a reporting type 2a if PTI=0. If PTI=1 or the number of CSI-RS ports is set to 2 or 4, the UE can make a report of a reporting type 2b. In doing so, if PTI=0, a 1st PMI is included in accordance with a single selected precoding matrix. On the other hand, if PTI=1, a single WB CQI value, which is calculated on the assumption of the subband set (S) transmission and a use of a single precoding matrix in every subband, and a 2nd PMI in accordance with the single selected precoding matrix are included. When PTI=1, if RI>1, a WB CQI having a 3-bit spatial difference can be reported.

In a transmission mode 4, 8 or 9, PMI and CQI are calculated conditionally for a last reported periodic RI. In case of other transmission modes, they are calculated conditionally for a rank 1 transmission.

Looking into a UE-selected SB CQI reported subframe, a UE selects a preferred optimal one (Best-1) from J BPs configured with Nj subband sets [cf. Table 20] and is then able to make a report of a reporting type 1 including a CQI value for a codeword 0 that reflects a selected subband transmission of the BP determined in accordance with a preferred subband indicator L. If RI>1, an SB CQI having an additional 3-bit spatial difference for an offset level of a codeword 1 can be reported. In doing so, the offset level of the codeword 1 indicates a difference of an SB CQI index for the codeword 1 from an SB CQI index for the codeword 0 and an SB CQI can be calculated on the assumption of a subband set (S) transmission and a use of a single precoding matrix in every subband.

In case of the transmission mode 9 having the CSI-RS port number set to 8, if PTI=0, a UE can make a report of a reporting type 2b. In doing so, a WB CQI value calculated on the assumption of a subband set (S) transmission and a use of a single precoding matrix in every subband and a 2nd PMI of a preferred precoding matrix selected from a codebook set on the assumption of the subband set (S) transmission are included. If RI>1, an SB CQI having an additional 3-bit spatial difference for an offset level of a codeword 1 can be reported. In doing so, the offset level of the codeword 1 indicates a difference of an SB CQI index for the codeword 1 from an SB CQI index for the codeword 0 and an SB CQI can be calculated on the assumption of the subband set (S) transmission and a use of the single precoding matrix in every subband.

If PTI=1 in transmission mode 9, a UE can make a report of a reporting type 1a per BP. In doing so, a CQI value for a codeword 0, which reflects a selected subband transmission of a BP determined in accordance with a preferred subband indicator L, is included. And, a 2nd PMI of a preferred precoding matrix selected from a codebook set on the assumption of the selected subband transmission of the BP determined in accordance with the determined preferred subband indicator L is included. If RI>1, an SB CQI having an additional 3-bit spatial difference for an offset level of the codeword 1 can be reported. In doing so, the offset level of the codeword 1 indicates a difference of an SB CQI index for the codeword 1 from an SB CQI index for the codeword 0 and an SB CQI can be calculated on the assumption of the subband set (S) transmission and a use of the single precoding matrix in every subband.

The subband selection and CQI in transmission mode 4, 8 or 9 are calculated conditionally for a last reported periodic WB PMI and RI. In other transmission modes, they are calculated conditionally for a last reported PMI and a rank 1 transmission.

Meanwhile, when a parameter 'ttiBundling' provided by an upper layer is set to TRUE, if there occurs contention between UL-SCH and a periodic CSI report in the course of a subframe bundling operation, a UE can drop the periodic CSI report of a PUCCH reporting type determined in a corresponding subframe. And, the UE may not multiplex a PUSCH transmission and a periodic CSI report payload with each other in a corresponding subframe.

4. CSI Methods for Supporting 256 QAM 4.1 Restricted CSI Measurement

In order to reduce the influence of inter-cell interference in a wireless network, a cooperative operation may be performed between network entities. For example, if a constraint that allows only transmission of common control information without data transmission during data transmission of cell A is imposed on cells other than cell A, interference with a user receiving data in cell A may be minimized In this manner, other cells except for a cell transmitting data at a specific time instant may transmit only minimal common control information through cooperation between the cells in a network, to thereby reduce inter-cell interference.

If a higher layer configures two CSI measurement subframe sets, $C_{CSI,0}$ and $C_{CSI,1}$ for this purpose, a UE may perform Resource-Restricted Measurement (RRM). It is assumed herein that CSI reference resources corresponding to the two measurement subframe sets belong to only one of two subframe sets.

[Table 25] below illustrates an exemplary higher-layer signal that configures CSI subframe sets.

TABLE 25

```
CQI-ReportConfig-r10 ::= SEQUENCE {
    cqi-ReportAperiodic-r10           CQI-ReportAperiodic-r10      OPTIONAL,
    nomPDSCH-RS-EPRE-Offset           INTEGER (-1..6),
    cqi-ReportPeriodic-r10            CQI-ReportPeriodic-r10       OPTIONAL, --
Need ON
    pmi-RI-Report-r9                  ENUMERATED {setup}           OPTIONAL,
    csi-SubframePatternConfig-r10     CHOICE {
        release                       NULL,
        setup                         SEQUENCE {
            csi-MeasSubframeSet1-r10      MeasSubframePattern-r10,
            csi-MeasSubframeSet2-r10      MeasSubframePattern-r10
        }
    }                                                              OPTIONAL  --
Need ON
}
```

[Table 25] illustrates an exemplary CQI report configuration message (CQI-Report Config) transmitted to configure CSI subframe sets. The CQI-Report Config message may include a cqi-ReportAperiodic-r10 Information Element (IE), a nomPDSCH-RS-EPRE-Offset IE, a cqi-Report-Periodci-r10 IE, a pmi-RI-Report-r9 IE, and a csi-subframe-PatternConfig IE. The csi-subframePatternConfig IE includes a csi-MeasSubframeSet1 IE and a csi-MeasSubframeSet2 IE which indicate measurement subframe patterns for the respective subframe sets.

A csi-MeasSubframeSet1-r10 IE and a csi-MeasSubframeSet2-r10 IE provide 40-bit bitmap information about subframes of the respective subframe sets. The CQI-ReportAperiodic-r10 IE is used for performing an aperiodic CQI report configuration for a UE, and the CQI-ReportPeriodic-r10 IE is used for performing a periodic CQI report configuration for a UE.

A nomPDSCH-RS-EPRE-Offset IE specifies a $\Delta_{offset}$ value. An actual value is set to $\Delta_{offset}*2$ [dB]. The pmi-RI-Report-r9 IE indicates configuration or non-configuration of a PMI/RI report. Only when TM8, TM9, or TM10 is configured, the EUTRAN configures the pmi-RI-Report-r9 IE.

4.2 Definition of CQI Table for Supporting 256 QAM

Now, a detailed description will be given of CSI feedback methods in the case where 256 QAM is supported in a wireless access system.

[Table 26] below is an exemplary CQI feedback table used in an LTE/LTE-A system.

TABLE 26

| CQI index | modulation | code rate × 1024 | efficiency |
|---|---|---|---|
| 0 | | out of range | |
| 1 | QPSK | 78 | 0.1523 |
| 2 | QPSK | 120 | 0.2344 |
| 3 | QPSK | 193 | 0.3770 |
| 4 | QPSK | 308 | 0.6016 |
| 5 | QPSK | 449 | 0.8770 |
| 6 | QPSK | 602 | 1.1758 |
| 7 | 16QAM | 378 | 1.4766 |
| 8 | 16QAM | 490 | 1.9141 |
| 9 | 16QAM | 616 | 2.4063 |
| 10 | 64QAM | 466 | 2.7305 |
| 11 | 64QAM | 567 | 3.3223 |
| 12 | 64QAM | 666 | 3.9023 |
| 13 | 64QAM | 772 | 4.5234 |
| 14 | 64QAM | 873 | 5.1152 |
| 15 | 64QAM | 948 | 5.5547 |

In [Table 26], a total of 16 CQI indexes may be defined in 4 bits. The CQI indexes are mapped to their corresponding modulation orders and code rates. [Table 26] is a CQI feedback table used in the current LTE/LTE-A system, supporting QPSK, 16 QAM, and up to 64 QAM. In embodiments of the present invention, the CQI feedback table for supporting legacy modulation schemes as listed in [Table 26] is referred to as a first CQI table or a legacy table.

The introduction of a high-order modulation scheme of 256 QAM or higher is considered for wireless access systems designed beyond the LTE-A system in order to increase DL data rates. To support 256 QAM for DL data, link adaptation should be considered along with legacy modulation schemes.

For CQI feedback in the LTE/LTE-A system as in [Table 26], a 4-bit CQI feedback table is used. If MIMO is supported, a 4-bit CQI feedback table is used for a first CodeWord (CW), and a 3-bit differential value from the CQI feedback value of the first CW is transmitted for a second CW.

For example, in the case of a CSI feedback transmitted on a PUCCH as illustrated in [Table 18], payload of a corresponding report type is transmitted in PUCCH format 2/2a/2b, or PUCCH format 3. However, RM-based block coding is performed for PUCCH format 2/2a/2b, or PUCCH format 3. Therefore, the size of input payload is limited. For example, it is assumed that a payload size of 13 bits or less is supported in PUCCH format 2/2a/2b, whereas 22 or fewer bits of input payload is supported in PUCCH format 3.

In consideration of the above condition, CQI feedback methods for supporting 256 QAM according to embodiments of the present invention will be described below.

4.2.1 Definition of Second CQI Feedback Table for Supporting 256 QAM-1

In embodiments of the present invention, a new CQI feedback table for supporting 256 QAM is defined. The CQI feedback table for 256 QAM may be referred to as a second CQI feedback table or a new table. Hereinbelow, a method for indicating 256 QAM using a part of legacy CQI indexes without increasing the size of the legacy CQI feedback table to define the second CQI feedback table will be described.

[Table 27] and [Table 28] illustrate exemplary configurations of the second CQI feedback table.

TABLE 27

| CQI index | modulation |
|---|---|
| 0 | out of range |
| 1 | QPSK |
| 2 | QPSK |
| 3 | QPSK |
| 4 | QPSK |
| 5 | QPSK |
| 6 | QPSK |
| 7 | 16QAM |
| 8 | 16QAM |
| 9 | 16QAM |
| 10 | 64QAM |
| 11 | 64QAM |
| 12 | 64QAM |
| 13 | 256QAM |
| 14 | 256QAM |
| 15 | 256QAM |

TABLE 28

| CQI index | modulation |
|---|---|
| 0 | out of range |
| 1 | QPSK |
| 2 | QPSK |
| 3 | QPSK |
| 4 | QPSK |
| 5 | QPSK |
| 6 | QPSK |
| 7 | 16QAM |
| 8 | 16QAM |
| 9 | 16QAM |
| 10 | 64QAM |
| 11 | 64QAM |
| 12 | 256QAM |
| 13 | 256QAM |
| 14 | 256QAM |
| 15 | 256QAM |

In the case where the size of the legacy CQI feedback table is not increased, an already defined CSI feedback operation may be reused. That is, compatibility with the legacy system is advantageously maintained.

Since [Table 26] being the first CQI feedback table is laid out in an ascending order of CQI indexes according to spectrum efficiencies, CQI indexes 10 to 15 used for 64 QAM are preferably borrowed for 256 QAM. Further, because a switching point at which switching occurs between 64 QAM and 256 QAM preferably corresponds to an effective coding rate of 0.6 to 0.65, CQI indexes 13, 14, and 15 (see [Table 27]) or CQI indexes 12 to 15 (see [Table 28]) may be used for 256 QAM.

Needless to say, CQI indexes for a modulation scheme other than 64 QAM may be borrowed to support 256 QAM in another method.

For example, [Table 29] below is another example of the CQI table supporting 256 QAM. The CQI table supporting 256 QAM is configured by removing the three lowest CQI indexes except for a legacy CQI index corresponding to out of range (i.e., CQI index 0) and then adding the 256 QAM CQI indexes.

TABLE 29

| CQI Index | Modulation | SINR | 1024 × coding rate | Coding rate | Spectral Efficiency |
|---|---|---|---|---|---|
| 0 | out of range | −7 | | | |
| 1 | QPSK | −1.324 | 308 | 0.300781 | 0.6016 |
| 2 | QPSK | 0.568 | 449 | 0.438477 | 0.877 |
| 3 | QPSK | 2.46 | 602 | 0.587891 | 1.1758 |
| 4 | QPSK | 4.352 | 378 | 0.369141 | 1.4766 |
| 5 | 16QAM | 6.244 | 490 | 0.478516 | 1.9141 |
| 6 | 16QAM | 8.136 | 616 | 0.601563 | 2.4063 |
| 7 | 16QAM | 10.028 | 466 | 0.455078 | 2.7305 |
| 8 | 64QAM | 11.92 | 567 | 0.553711 | 3.3223 |
| 9 | 64QAM | 13.812 | 666 | 0.650391 | 3.9023 |
| 10 | 64QAM | 15.704 | 772 | 0.753906 | 4.5234 |
| 11 | 64QAM | 17.596 | 873 | 0.852539 | 5.1152 |
| 12 | 64QAM | 19.488 | 948 | 0.925781 | 5.5547 |
| 13 | 256QAM | 21.38 | 780 | 0.761719 | 6.09375 |
| 14 | 256QAM | 23.272 | 879 | 0.857937 | 6.863492 |
| 15 | 256QAM | 25.164 | 938 | 0.915675 | 7.325397 |

[Table 30] illustrates another exemplary 4-bit CQI feedback table supporting 256 QAM. [Table 30] is an exemplary CQI table configured by removing the lowest three CQI indexes from the legacy CQI table and then adding the 256 QAM CQI indexes.

TABLE 30

| CQI Index | Modulation | SINR | 1024 × coding rate | Coding rate | Spectral Efficiency |
|---|---|---|---|---|---|
| 0 | out of range | | | | |
| 1 | QPSK | −7 | 78 | 0.076172 | 0.1523 |
| 2 | QPSK | 0.568 | 449 | 0.438477 | 0.877 |
| 3 | QPSK | 2.46 | 602 | 0.587891 | 1.1758 |
| 4 | QPSK | 4.352 | 378 | 0.369141 | 1.4766 |
| 5 | 16QAM | 6.244 | 490 | 0.478516 | 1.9141 |
| 6 | 16QAM | 8.136 | 616 | 0.601563 | 2.4063 |
| 7 | 16QAM | 10.028 | 466 | 0.455078 | 2.7305 |
| 8 | 64QAM | 11.92 | 567 | 0.553711 | 3.3223 |
| 9 | 64QAM | 13.812 | 666 | 0.650391 | 3.9023 |
| 10 | 64QAM | 15.704 | 772 | 0.753906 | 4.5234 |
| 11 | 64QAM | 17.596 | 873 | 0.852539 | 5.1152 |
| 12 | 64QAM | 19.488 | 948 | 0.925781 | 5.5547 |
| 13 | 256QAM | 21.38 | 780 | 0.761719 | 6.09375 |
| 14 | 256QAM | 23.272 | 879 | 0.857937 | 6.863492 |
| 15 | 256QAM | 25.164 | 938 | 0.915675 | 7.325397 |

4.2.2 Definition of Second CQI Feedback Table for Supporting 256 QAM-2

A method for increasing the size of the legacy 4-bit CQI feedback table to 5 or more bits to support 256 QAM will be described below. This method is advantageous in that it enables accurate feedback against a radio channel change, although it is necessary to change a coding scheme for CSI.

For the convenience of description, increasing the size of the second CQI feedback table to 5 bits will be described in the embodiment of the present invention. It is obvious that the second CQI feedback table may have a larger size according to a coding rate or a radio channel environment.

In general, a radio transmission channel changes by 30 to 40 dB. Therefore, when a 5-bit CQI feedback table is configured, it is preferred to set a Signal to Interference plus Noise Ratio (SINR) difference between CQI indexes to be about 1 dB. For example, given a step size of 1 dB, a dynamic range is about 32 dB. Thus, most of the dynamic range of a radio transmission channel may be covered.

The lowest CQI index, that is, CQI index 0 is preferably set to out-of-range, which means that service is not available, and corresponds to an SINR of about −6 dB to −7 dB.

Therefore, a 5-bit CQI feedback table may represent a radio channel having a dynamic range of 32 dB with a 1-dB resolution. Also, it is assumed that the effective coding rate of a switching point at which switching occurs between modulation schemes is 0.6 to 0.65. A second CQI table may be configured as [Table 31] by reflecting the above considerations.

TABLE 31

| CQI index | Modulation |
|---|---|
| 0 | Out of range |
| 1 | QPSK |
| 2 | QPSK |
| 3 | QPSK |
| 4 | QPSK |
| 5 | QPSK |
| 6 | QPSK |
| 7 | QPSK |
| 8 | QPSK |
| 9 | QPSK |
| 10 | QPSK |
| 11 | QPSK |
| 12 | QPSK |
| 13 | QPSK |
| 14 | QPSK |
| 15 | 16QAM |
| 16 | 16QAM |
| 17 | 16QAM |
| 18 | 16QAM |
| 19 | 16QAM |
| 20 | 16QAM |
| 21 | 64QAM |
| 22 | 64QAM |
| 23 | 64QAM |
| 24 | 64QAM |
| 25 | 64QAM |
| 26 | 256QAM |
| 27 | 256QAM |
| 28 | 256QAM |
| 29 | 256QAM |
| 30 | 256QAM |
| 31 | 256QAM |

[Table 31] is an example of the second CQI feedback table, which is a 5-bit CQI feedback table supporting 256 QAM. In another method, CQI indexes 25 to 31 may be assigned for 256 QAM in [Table 31].

If [Table 31] is used, it is assumed that methods defined for 3-bit differential CQIs defined for a second CW in legacy MIMO transmission, and the number of PMI/RI bits variable according to an antenna configuration are used.

Particularly in Transmission Modes (TMs) 1, 2, 3, and 7 that do not require PMT/RI feedback and TMs 8, 9, and 10 without PMI/RI feedback, a legacy CSI feedback method may be reused. This corresponds to PUCCH reporting modes 1-0 and 2-0.

Accordingly, it may be configured that only PUCCH reporting mode 1-1 uses a 5-bit second CQI feedback table in the case of TMs 8, 9, and 10 requiring PMI/RI feedback. If 11 or more CQI feedback bits are needed for a specific antenna configuration in PUCCH reporting type 2/2a/2b, it may be configured that PUCCH format 2b or PUCCH format 3 multiplexed with an ACK/NACK of an extended CP is used in the wireless access system.

[Table 32] is another exemplary 5-bit CQI feedback table supporting 256 QAM.

TABLE 32

| CQI Index | Modulation | SINR | 1024 × coding rate | Coding rate | Spectral Efficiency |
|---|---|---|---|---|---|
| 0 | out of range | | | | |
| 1 | QPSK | −7 | 78 | 0.076172 | 0.1523 |
| 2 | QPSK | −5.108 | 120 | 0.117188 | 0.2344 |
| 3 | QPSK | −3.216 | 193 | 0.188477 | 0.377 |
| 4 | QPSK | −1.324 | 308 | 0.300781 | 0.6016 |
| 5 | QPSK | 0.568 | 449 | 0.438477 | 0.877 |
| 6 | QPSK | 2.46 | 602 | 0.587891 | 1.1758 |
| 7 | QPSK | 4.352 | 378 | 0.369141 | 1.4766 |
| 8 | 16QAM | 6.244 | 490 | 0.478516 | 1.9141 |
| 9 | 16QAM | 8.136 | 616 | 0.601563 | 2.4063 |
| 10 | 16QAM | 10.028 | 466 | 0.455078 | 2.7305 |
| 11 | 64QAM | 11.92 | 567 | 0.553711 | 3.3223 |
| 12 | 64QAM | 13.812 | 666 | 0.650391 | 3.9023 |
| 13 | 64QAM | 15.704 | 772 | 0.753906 | 4.5234 |
| 14 | 64QAM | 17.596 | 873 | 0.852539 | 5.1152 |
| 15 | 64QAM | 19.488 | 948 | 0.925781 | 5.5547 |
| 16 | 256QAM | 21.38 | 780 | 0.761719 | 6.09375 |
| 17 | 256QAM | 23.272 | 879 | 0.857937 | 6.863492 |
| 18 | 256QAM | 25.164 | 938 | 0.915675 | 7.325397 |
| 19~31 | reserved | | | | |

4.3 CSI Reporting Method for Supporting 256 QAM-1

In section 4.2, new CQI feedback tables ([Table 27] to [Table 32]) defined for supporting 256 QAM have been described. Therefore, if a CSI feedback including a CQI index is transmitted on a PUCCH and/or a PUSCH, an eNB and/or a UE may report CSI just using a new defined CQI feedback table.

That is, the UE may transmit a CQI index using a 4-bit or 5-bit CQI feedback table as described in section 4.2 irrespective of whether the UE supports MIMO transmission or not.

The UE may be configured not to report CSI payload of 11 or more bits at a specific CSI reporting time. In this case, the CSI transmission is dropped.

4.4 CSI Reporting Method for Supporting 256 QAM-2

When the UE reports CSI on a PUCCH, the UE may transmit CSI of up to 6 bits in a TM that does not support MIMO transmission, and may transmit CSI of up to 11 bits in a TM that supports MIMO transmission. If 4-bit or 5-bit CQI indexes are used to represent a CQI feedback table for 256 QAM, there is no problem with CSI transmission on a PUCCH in a TM that does not support MIMO transmission. However, since the size of CSI exceeds 11 bits in a TM supporting MIMO transmission, a problem occurs to CSI reporting.

In this case, it may be configured that the first CQI feedback table given as [Table 26] is used for CSI reporting in a TM in which MIMO transmission is not performed, and the second CQI feedback table given as [Table 27] to [Table 32] is used for CSI reporting in a TM supporting MIMO transmission in the wireless access system.

4.5 CSI Reporting Method for Supporting 256 QAM-3

A case in which both the first CQI feedback table (or the legacy table) of the LTE/LTE-A system and the second CQI feedback table defined to support 256 QAM are used will be described below.

Figure 17:
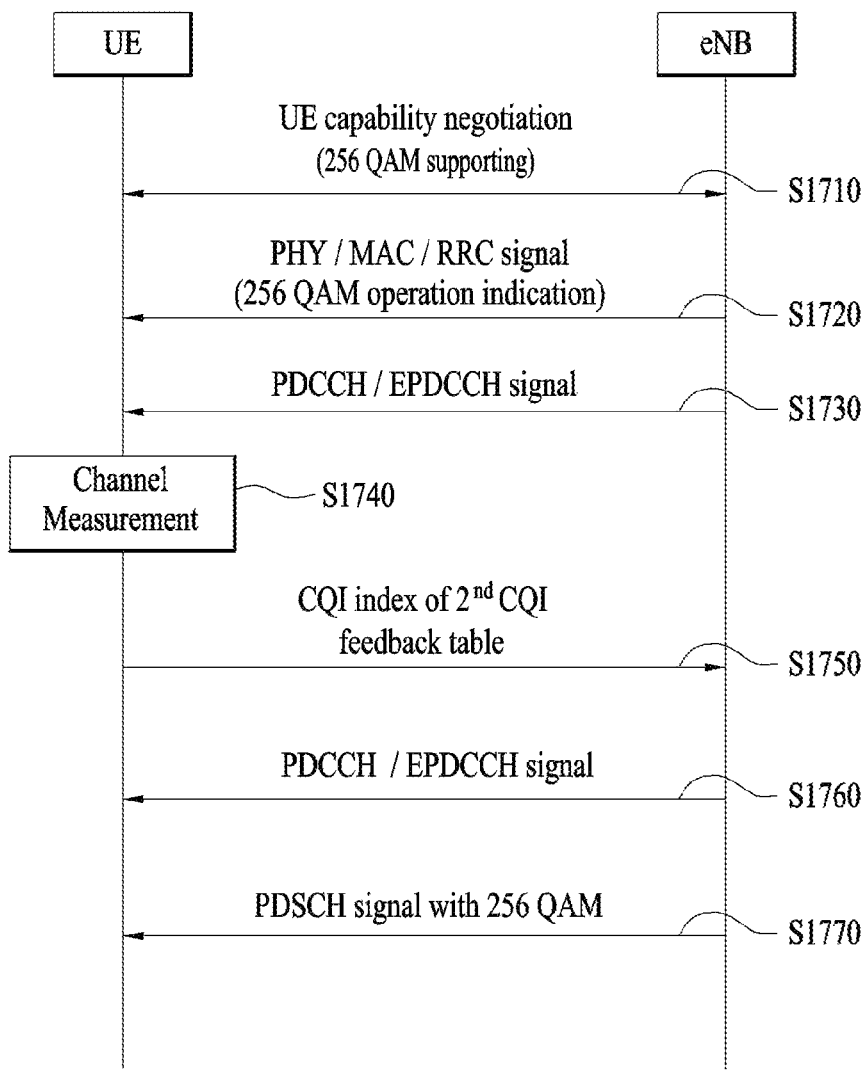
FIG. 17 is a flowchart illustrating one of methods for reporting Channel State Information (CSI) through an uplink channel.

FIG. 17 is a flowchart illustrating one of methods for reporting CSI on a UL channel according to an embodiment of the present invention.

In FIG. 17, it is assumed that each of a UE and an eNB preserves the first and second CQI feedback tables. The first CQI feedback table is given as [Table 25], for example, and defines CQI feedback indexes for legacy UEs. The second CQI feedback table is given as [Tale 26], [Table 27], or [Table 28] and defines CQI feedback indexes for UEs supporting 256 QAM. Obviously, aside from [Tale 26], [Table 27], and [Table 28], the other CQI feedback tables configured to support 256 QAM in the embodiments of the present invention are also available as the second CQI feedback table.

Referring to FIG. 17, the UE and the eNB perform a UE capabilities negotiation procedure to negotiate support or non-support of 256 QAM after initial access (S1710).

It is assumed that the UE and the eNB confirm mutual support of 256 QAM and exchange various parameters and/or fields to support 256 QAM in step S1710.

Subsequently, if the eNB needs to transmit DL data in 256 QAM, the eNB may transmit to the UE a physical-layer signal (e.g. a PDCCH signal and/or an EPDCCH signal) or a higher-layer signal (e.g., a MAC signal or an RRC signal), which includes a 256 QAM indicator indicating use of 256 QAM or a table ID indicating the second CQI feedback table (S1720).

Upon receipt of the 256 QAM indicator indicating use of 256 QAM or the table ID indicating the second CQI feedback table in step S1720, the UE may determine that DL data to be transmitted by the eNB may be modulated in 256 QAM.

Then, the eNB transmits a PDCCH/EPDCCH signal including UL scheduling information to the UE in order to achieve CSI. Herein, the PDCCH/EPDCCH signal may include a CSI request field, thereby indicating a periodic or aperiodic CSI request (S1730).

The UE performs channel measurement to acquire CSI for a channel established with the eNB (S1740).

Upon receipt of the 256 QAM indicator indicating use of 256 QAM in step S1720, the UE selects an appropriate CQI index in the second CQI feedback table based on CSI measured in step S1740. Then, the UE may transmit the selected CQI index on a UL channel indicated by the UL scheduling information to the eNB. The UL channel may be a PUCCH or a PUSCH (S1750).

If the CQI index indicates availability of 256 QAM, the eNB transmits to the UE a PDCCH signal and/or EPDCC signal including an IMCS indicating 256 QAM and an appropriate coding rate. The UE may determine a Transport Block Size (TBS) supporting 256 QAM according to the received IMCS (S1760).

The eNB modulates DL data (e.g., a DL-SCH signal) according to the modulation order and TBS indicated to the UE by the IMCS, and transmits the DL data to the UE. In addition, the UE receives and demodulates the DL data modulated in 256 QAM based on the IMCS received in step S1760 (S1770).

In another embodiment of FIG. 17, in the case where a CSI report is transmitted on a PUCCH, if a 5-bit CQI index is used, the size of CSI information bits transmittable on the PUCCH may be exceeded at a specific reporting time instant. In this case, the UE may transmit the CQI index in an aperiodic CSI report (i.e., on a PUSCH) to the eNB.

Figure 18:
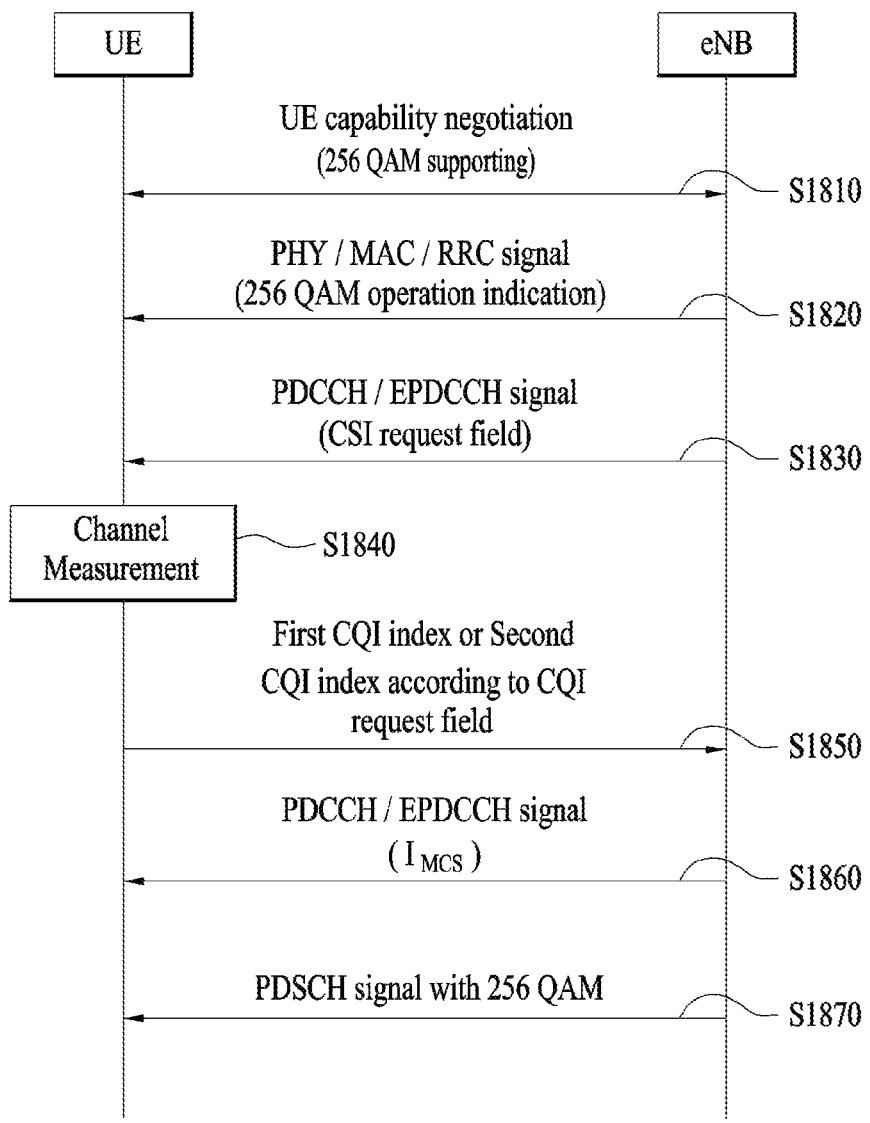
FIG. 18 is a flowchart illustrating one of methods for reporting CSI through a Physical Uplink Shared Channel (PUSCH).

FIG. 18 is a flowchart illustrating one of methods for reporting CSI on a PUSCH according to an embodiment of the present invention.

In FIG. 18, it is assumed that each of a UE and an eNB preserves the first CQI feedback table (e.g., [Table 25]) and the second CQI feedback table (e.g., [Table 26], [Table 27], or [Table 28]).

Referring to FIG. 18, the UE and the eNB perform a UE capabilities negotiation procedure to negotiate support or non-support of 256 QAM after initial access (S1810).

It is assumed that the UE and the eNB confirm mutual support of 256 QAM and exchange various parameters and/or fields to support 256 QAM in step S1810.

Subsequently, if the eNB needs to transmit DL data in 256 QAM, the eNB may transmit to the UE a physical-layer signal (e.g. a PDCCH signal and/or an EPDCCH signal) or a higher-layer signal (e.g., a MAC signal or an RRC signal), which includes a 256 QAM indicator indicating use of 256 QAM or a table ID indicating the second CQI feedback table (S1820).

Upon receipt of the 256 QAM indicator indicating use of 256 QAM or the table ID indicating the second CQI feedback table in step S1820, the UE may determine that DL data to be transmitted by the eNB may be modulated in 256 QAM.

Then, the eNB transmits a PDCCH/EPDCCH signal including UL scheduling information to the UE in order to achieve CSI. Herein, the PDCCH/EPDCCH signal may include a CSI request field, thereby indicating a periodic or aperiodic CSI request (S1830).

The UE performs channel measurement to acquire CSI for a channel established with the eNB (S1840).

Upon receipt of the 256 QAM indicator indicating use of 256 QAM in step S1820, the UE selects an appropriate CQI index in the second CQI feedback table based on CSI measured in step S1840. Then, the UE may transmit the selected CQI index in an aperiodically transmitted PUSCH signal to the eNB (S1850). If the 256 QAM indicator indicates non-use of 256 QAM in step S1820, the UE may select a CQI index in the first CQI feedback table and transmit CSI periodically on a PUCCH to the eNB (S1850)

If the CQI index indicates availability of 256 QAM, the eNB transmits a PDCCH signal and/or EPDCC signal including an IMCS indicating 256 QAM and an appropriate coding rate. The UE may determine a TBS supporting 256 QAM according to the received IMCS (S1860).

The eNB modulates DL data (e.g., a DL-SCH signal) according to the modulation order and TBS indicated to the UE by the IMCS, and transmits the DL data to the UE. In addition, the UE receives and demodulates the DL data modulated in 256 QAM based on the IMCS received in step S1860 (S1870).

Figure 19:
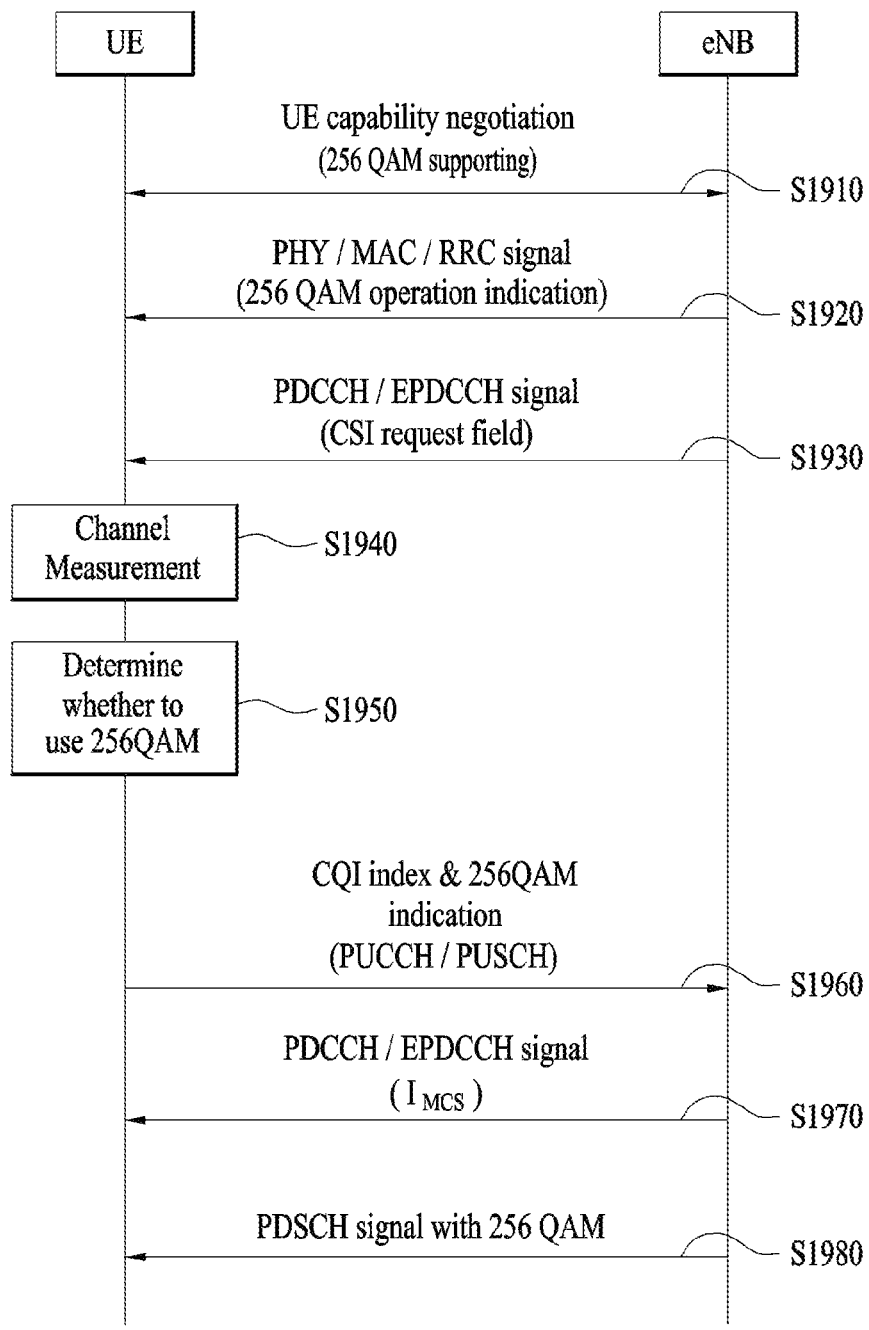
FIG. 19 is a flowchart illustrating one of methods for reporting CSI through a PUSCH.

FIG. 19 is a flowchart illustrating another of the methods for reporting CSI on a PUSCH according to an embodiment of the present invention.

The embodiment of the present invention illustrated in FIG. 19 is basically similar to the embodiment illustrated in FIG. 18. Thus, for the embodiment of the present invention illustrated in FIG. 19, the description of FIG. 18 is referred to. The following description focuses on a difference from the embodiment of the present invention illustrated in FIG. 18.

A UE supporting 256 QAM may transmit information indicating whether the UE uses 256 QAM and what CQI table it uses to an eNB. That is, the UE may determine whether to use 256 QAM based on a channel measurement result acquired in step S1940 (S1950).

For example, if a channel state is so good as to allow use of 256 QAM, the UE may transmit a CSI report using the second CQI feedback table supporting 256 QAM, whereas if the channel state is too poor to allow use of 256 QAM, the UE may transmit a CSI report using the first CQI feedback table. The UE transmits the ID of its used CQI feedback table along with the CSI report to the eNB (S1960).

If the UE uses the first CQI feedback table in step S1960, the UE may transmit the CSI report on a PUCCH and/or a PUSCH, and if the UE uses the second CQI feedback table in step S1960, the UE may transmit the CSI report on a PUSCH.

In another embodiment, it may be configured that if the UE transmits a CQI feedback on a PUCCH, the UE always selects a CQI index from the first CQI feedback table, and if the UE transmits a CQI feedback on a PUSCH, the UE always selects a CQI index from the second CQI feedback table, so that a used feedback table may be indicated implicitly to the eNB. In this case, upon receipt of the CSI report on the PUCCH, the eNB may interpret a CQI index from the first CQI feedback table, and upon receipt of the CSI report on the PUSCH, the eNB may interpret a CQI index from the second CQI feedback table. Accordingly, the UE does not need to transmit the ID of the CQI feedback table in step S1960.

The subsequent steps S1970 and S1980 are performed in the same manner as steps S1860 and S1870 of FIG. 18.

4.6 CSI Reporting Method for Supporting 256 QAM-4

If the channel measurement is performed using a Channel State Information-Reference Signal (CSI-RS) and a Channel State Information-Interference Measurement (CSI-IM) in steps S1740, S1840, and S1940 of FIGS. 17, 18, and 19, a UE supporting 256 QAM may be configured to select a CQI feedback table on a CSI process basis.

Or a CQI feedback table supporting 256 QAM, such as [Table 26], [Table 27], or [Table 28] may be configured on a CSI subset basis. This is because the interference environment is much different between CSI subsets, and thus a modulation scheme requiring a high SINR, such as 256 QAM may not be supported for a specific CSI subset. Herein, a CSI subset refers to one or more CSI subframe sets configured for a UE.

The UE transmits a CSI report for one or more configured CSI processes or CSI subsets. For the same CSI-RS resources, the UE may configure the first and second CQI feedback tables for each of CSI processes or each of CSI subsets.

Therefore, upon receipt of one or more CSI reports for one or more CSI processes from the UE, the eNB may transmit MCS information in DCI of a PDCCH signal according to the one or more CSI report. Even though the first CQI feedback table that does not support 256 QAM is used for a part of the CSI processes, the eNB may transmit an MCS index ($I_{MCS}$) indicating 256 QAM to the UE according to a channel state and then transmit DL data modulated in 256 QAM to the UE.

5. CSI Reporting Method in Case of Configuring RI Reference Process

The network or the eNB may configure an RI reference process for a UE for which TM 10 is configured. It is assumed herein that CSI processes related to the RI reference process have the same restricted RI based on a codebook subset restriction imposed on a CSI reporting mode, the number of CSI-RS antenna ports, and/or a subframe measurement set.

In this case, it may be assumed that the UE uses the same CQI table for the CSI processes related to the RI reference process. That is, the UE may use a CQI feedback table supporting 256 QAM (i.e., the second CQI feedback table) or a legacy CQI table not supporting 256 QAM (i.e., the first CQI table) for all of CSI processes related to one RI reference process.

If different CQI tables are used for CSI processes related to a specific RI reference process (e.g., if the second CQI feedback table is used for a first CSI process X related to a specific RI reference process, and the first CQI feedback table is used for a second CSI process Y related to the specific RI reference process), the inaccuracy of CQI estimation may be increased because the related CSI processes use the same RI value for the specific RI reference process.

For example, it is assumed that the eNB performs frequency selective Dynamic Point Blanking (DPB) in TM 10. DPB is a transmission scheme in which other Transmission Points (TPs) of a CoMP set do not transmit data in an RB in which one TP transmits data, to thereby reduce interference. In DPB, changing a transmitting TP according to a frequency-domain channel state in a plurality of RBs is referred to as frequency selection.

When this frequency selective DPB is implemented, if the UE transmits a CSI feedback in a CSI process for which a different rank is assumed in each PRB during a CSI feedback for a specific PRB pair, the eNB may have a large correction error in selecting an MCS for the PRB pair. Because the same rank is assumed for one PDSCH, and an RI and a CQI/PMI are considered together for CSI calculation in the current LTE/LTE-A standard, if different ranks are used, the eNB should reflect information about the ranks in selecting an MCS during correction.

Likewise, if different CQI tables are used for different RI reference processes, the eNB should correct CSI feedback values for MCS selection, resulting in large errors during channel estimation.

In embodiments of the present invention, one or more CSI processes may be allocated to one UE, and one or more RI reference processes may be allocated to the one or more CSI processes. Herein, one or more CSI processes may be associated with one RI reference process. Also, an RI reference process may be designated for each CSI process, and two or more RI reference processes may be configured for one UE.

FIG. 20 is a flowchart illustrating one of CSI reporting methods in the case where an RI reference process is allocated.

In FIG. 20, it is assumed that steps S1710 to S1730, S1810 to S1830, or S1910 to 1930 of FIG. 17, 18, or 19 have already been performed. That is, the method illustrated in FIG. 20 may be applied to a periodic or aperiodic CSI reporting method.

Referring to FIG. 20, the eNB may configure an RI reference process for the UE by a higher-layer signal. Two or more RI reference processes may be configured for one UE, and one or more CSI processes may be associated with each RI reference process (S2010).

The UE may measure a channel state by receiving a DL channel (e.g., a PDSCH) from the eNB (S2020).

To report CSI periodically or aperiodically to the eNB, the UE may select a CQI index by using the same CQI table for the RI reference processes (S2030).

In step S2030, if two RI reference processes, that is, a first RI reference process and a second RI reference process are allocated to the UE, the UE may calculate CSI for each of CSI processes associated with the RI reference processes. The UE may use the same CQI table for the CSI processes associated with each RI reference process. For example, the first CQI table may be used for all of the CSI processes associated with the first RI reference table, and the second CQI table may be used for all of the CSI processes associated with the second RI reference table. In other words, the same CQI table may be applied to CSI processes associated with one RI reference process, and the same or different CQI tables may be applied to different RI reference processes.

The UE may report the CSI measured in step S2030 to the eNB on a PUSCH or a PUCCH (S2040).

6. Apparatus

Figure 21:
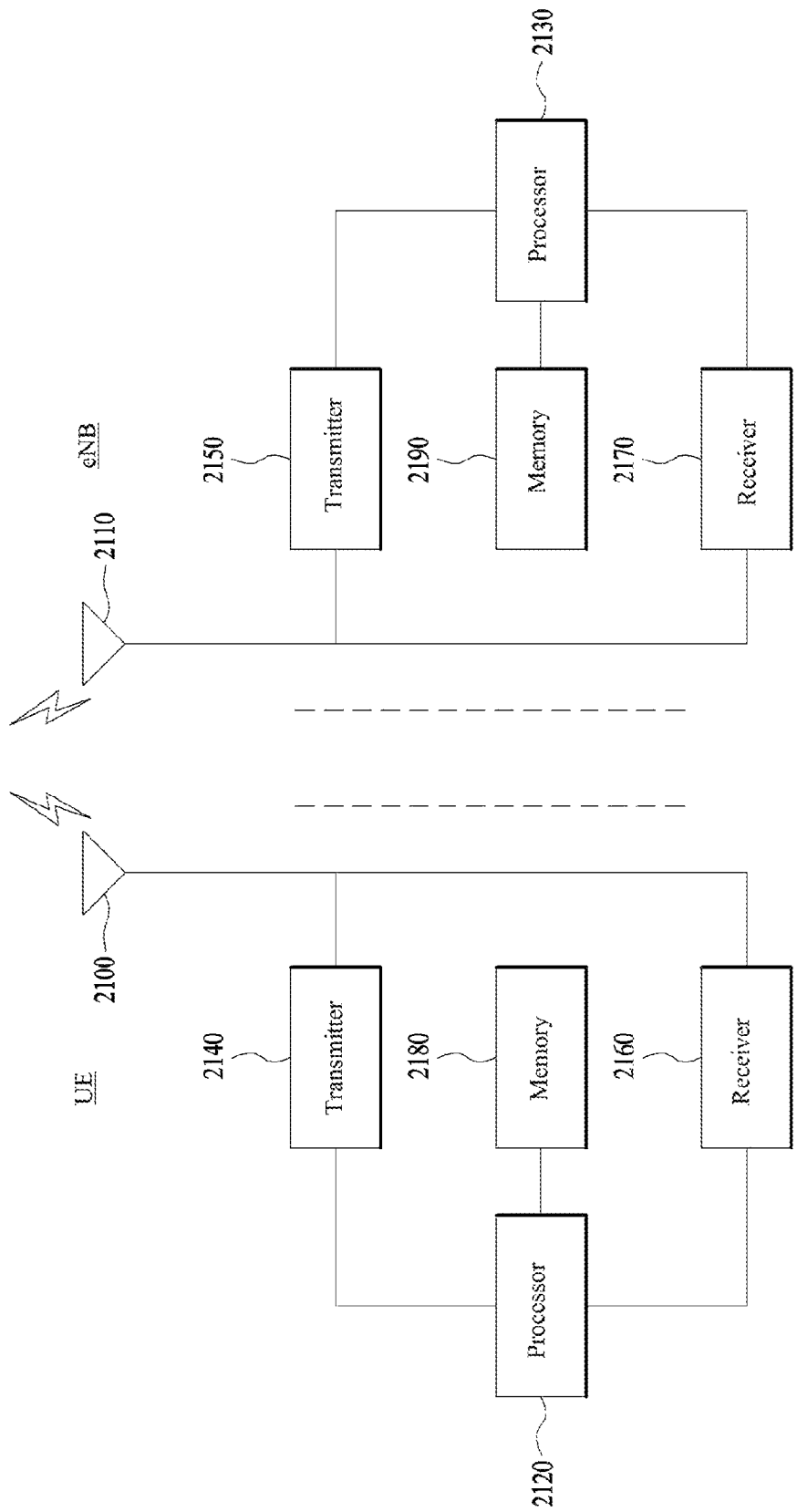
FIG. 21 is a block diagram of apparatuses for implementing the methods described in FIGS. 1 to 19.

Apparatuses illustrated in FIG. 21 are means that can implement the methods described before with reference to FIGS. 1 to 20.

A UE may act as a transmitter on a UL and as a receiver on a DL. An eNB may act as a receiver on a UL and as a transmitter on a DL.

That is, each of the UE and the eNB may include a Transmitter 2140 or 2150 and a receiver 2160 or 2170, for controlling transmission and reception of information, data, and/or messages, and an antenna 2100 or 2110 for transmitting and receiving information, data, and/or messages.

Each of the UE and the eNB may further include a processor 2120 or 2130 for implementing the afore-described embodiments of the present disclosure and a memory 2180 or 2190 for temporarily or permanently storing operations of the processor 2120 or 2130.

The embodiments of the present invention may be implemented using the components and functions of the afore-described UE and eNB. For example, the processor of the eNB and/or the processor of the UE may keep and manage a first CQI feedback table not supporting 256 QAM and a second CQI feedback table supporting 256 QAM by performing the methods described in Section 1 to Section 5 in combination. After indicating to the UE whether 256 QAM is used, the eNB may transmit DL data modulated in 256 QAM. After receiving DL data, the UE may transmit a CQI index selected from the second CQI feedback table to the eNB during CSI reporting.

Also, the processor of the UE may be configured to apply the same CQI feedback table on an RI reference process basis. For example, the UE may apply the second CQI feedback table to CSI processes associated with a first RI reference process, and the first CQI feedback table to CSI processes associated with a second RI reference process. For detailed methods, refer to the description of Section 1 to Section 5. Also, the processor of the UE may further include the components described with reference to FIG. 16.

The transmitter and the receiver of the UE and the eNB may perform a packet modulation/demodulation function for data transmission, a high-speed packet channel coding function, OFDMA packet scheduling, TDD packet scheduling, and/or channelization. Each of the UE and the eNB of FIG. 21 may further include a low-power Radio Frequency (RF)/Intermediate Frequency (IF) module.

Meanwhile, the UE may be any of a Personal Digital Assistant (PDA), a cellular phone, a Personal Communication Service (PCS) phone, a Global System for Mobile (GSM) phone, a Wideband Code Division Multiple Access (WCDMA) phone, a Mobile Broadband System (MBS) phone, a hand-held PC, a laptop PC, a smart phone, a Multi Mode-Multi Band (MM-MB) terminal, etc.

The smart phone is a terminal taking the advantages of both a mobile phone and a PDA. It incorporates the functions of a PDA, that is, scheduling and data communications such as fax transmission and reception and Internet connection into a mobile phone. The MB-MM terminal refers to a terminal which has a multi-modem chip built therein and which can operate in any of a mobile Internet system and other mobile communication systems (e.g. CDMA 2000, WCDMA, etc.).

Embodiments of the present disclosure may be achieved by various means, for example, hardware, firmware, software, or a combination thereof.

In a hardware configuration, the methods according to exemplary embodiments of the present disclosure may be achieved by one or more Application Specific Integrated Circuits (ASICs), Digital Signal Processors (DSPs), Digital Signal Processing Devices (DSPDs), Programmable Logic Devices (PLDs), Field Programmable Gate Arrays (FPGAs), processors, controllers, microcontrollers, microprocessors, etc.

In a firmware or software configuration, the methods according to the embodiments of the present disclosure may be implemented in the form of a module, a procedure, a function, etc. performing the above-described functions or operations. A software code may be stored in the memory 2180 or 2190 and executed by the processor 2120 or 2130. The memory is located at the interior or exterior of the processor and may transmit and receive data to and from the processor via various known means.

Those skilled in the art will appreciate that the present disclosure may be carried out in other specific ways than those set forth herein without departing from the spirit and essential characteristics of the present disclosure. The above embodiments are therefore to be construed in all aspects as illustrative and not restrictive. The scope of the invention should be determined by the appended claims and their legal equivalents, not by the above description, and all changes coming within the meaning and equivalency range of the appended claims are intended to be embraced therein. It is obvious to those skilled in the art that claims that are not explicitly cited in each other in the appended claims may be presented in combination as an embodiment of the present disclosure or included as a new claim by a subsequent amendment after the application is filed.

INDUSTRIAL APPLICABILITY

The present disclosure is applicable to various wireless access systems including a 3GPP system, a 3GPP2 system, and/or an IEEE 802.xx system. Besides these wireless access systems, the embodiments of the present disclosure are applicable to all technical fields in which the wireless access systems find their applications.

The invention claimed is:

1. A method for transmitting a Channel State Information (CSI) report by a User Equipment (UE) supporting 256-ary Quadrature Amplitude Modulation (256 QAM) in a wireless access system, the method performed by the UE and comprising;
   receiving a Radio Resource Control (RRC) signal for configuring a rank indicator (RI) reference process;
   measuring channel status information (CSI) for two or more CSI processes associated with the RI reference process configured for the UE;
   selecting a channel quality indication (CQI) index using a first CQI table or a second CQI table; and
   transmitting CSI reports corresponding to CSI subsets included in each of the two or more CSI processes,
   wherein the first CQI table supports a 64 QAM and the second CQI table supports the 256 QAM,
   wherein the two or more CSI processes are associated with the RI reference process and only the same CQI table is applied to the two or more CSI processes, and
   wherein the same RI is applied to the two or more CSI processes which are associated with the RI reference process, and the same RI is configured according to a codebook subset restriction applied to CSI reporting modes for the CSI reports.

2. The method according claim 1, wherein the CSI subsets are CSI measurement subframe sets.

3. The method according to claim 2, wherein each of the CSI reports is calculated by using CSI-Reference Signals (CSI-RSs) and CSI Inference Measurements (CSI-IMs) corresponding to each of the CSI measurement subframe sets.

4. The method according to claim 3, wherein the CSI reports are periodically transmitted via a Physical Uplink Control Channel (PUCCH).

5. The method according to claim 3, wherein the CSI reports are aperiodically transmitted via a Physical Uplink Shared Channel (PUSCH).

6. A method for receiving a Channel State Information (CSI) report from a User Equipment (UE) supporting 256-ary Quadrature Amplitude Modulation (256 QAM) in a wireless access system, the method performed by an enhanced Node B (eNB) and comprising;
   transmitting a Radio Resource Control (RRC) signal for configuring a rank indicator (RI) reference process; and
   receiving CSI reports corresponding to CSI subsets included in each of two or more CSI processes,
   wherein each of the CSI reports includes a channel quality indicator (CQI) index selected from a first CQI table or a second CQI table,
   wherein the first CQI table supports a 64 QAM and the second CQI table supports the 256 QAM,
   wherein the two or more CSI processes are associated with the RI reference process and only the same CQI table is applied to the two or more CSI processes, and
   wherein the same RI is applied to the two or more CSI processes, and the same RI is configured according to a codebook subset restriction applied to CSI reporting modes for the CSI reports.

7. The method according claim 6, wherein the CSI subsets are CSI measurement subframe sets.

8. The method according to claim 7, wherein each of the CSI reports is calculated by using CSI-Reference Signals (CSI-RSs) and CSI Inference Measurements (CSI-IMs) corresponding to each of the CSI measurement subframe sets.

9. The method according to claim 8, wherein the CSI reports are periodically transmitted via a Physical Uplink Control Channel (PUCCH).

10. The method according to claim 8, wherein the CSI reports are aperiodically transmitted via a Physical Uplink Shared Channel (PUSCH).

11. A user equipment (UE) for transmitting a Channel State Information (CSI) report in a wireless access system, the UE comprising;
   a receiver;
   a transmitter; and
   a processor controlling the receiver and the transmitter for transmitting the CSI report,
   wherein the processor:
   controls the receiver to receive a Radio Resource Control (RRC) signal for configuring a rank indicator (RI) reference process,
   measures channel status information (CSI) for two or more CSI processes associated with the RI reference configured for the UE,
   selects a channel quality indication (CQI) index using a first CQI table or a second CQI table,
   controls the transmitter to transmit CSI reports corresponding to CSI subsets included in each of the two or more CSI processes,
   wherein the UE supports a 256-ary Quadrature Amplitude Modulation (256 QAM),
   wherein the first CQI table supports a 64 QAM and the second CQI table supports the 256 QAM,
   wherein the two or more CSI processes are associated with the RI reference process and only the same CQI table is applied to the two or more CSI processes, and wherein the same RI is applied to the two or more CSI processes which are associated with the RI reference process, and the same RI is configured according to a codebook subset restriction applied to CSI reporting modes for the CSI reports.

12. The UE according claim 11, wherein the CSI subsets are CSI measurement subframe sets.

13. The UE according to claim 12, wherein each of the CSI reports is calculated by using CSI-Reference Signals (CSI-RSs) and CSI Inference Measurements (CSI-IMs) corresponding to each of the CSI measurement subframe sets.

14. The UE according to claim 11, wherein the CSI reports are periodically transmitted via a Physical Uplink Control Channel (PUCCH).

15. The UE according to claim 11, wherein the CSI reports are aperiodically transmitted via a Physical Uplink Shared Channel (PUSCH).

16. An enhanced Node B (eNB) for receiving a Channel State Information (CSI) report from a User Equipment (UE) supporting 256-ary Quadrature Amplitude Modulation (256 QAM) in a wireless access system, the eNB comprising;
a receiver;
a transmitter; and
a processor controlling the receiver and the transmitter for receiving the CSI report,
wherein the processor:
controls the transmitter to transmit a Radio Resource Control (RRC) signal for configuring a rank indicator (RI) reference process; and
controls the receiver to receive CSI reports corresponding to CSI subsets included in each of two or more CSI process,
wherein each of the CSI reports includes a channel quality indicator (CQI) index selected from a first CQI table or a second CQI table,
wherein the first CQI table supporting a 64 QAM and the second CQI table supporting the 256 QAM,
wherein the two or more CSI processes are associated with the RI reference process and only the same CQI table is applied to the two or more CSI processes, and
wherein the same RI is applied to the two or more CSI processes which are associated with the RI reference process, and the same RI is configured according to a codebook subset restriction applied to CSI reporting modes for the CSI reports.

17. The method according claim 16, wherein the CSI subsets are CSI measurement subframe sets.

18. The method according to claim 17, wherein each of the CSI reports is calculated by using CSI-Reference Signals (CSI-RSs) and CSI Inference Measurements (CSI-IMs) corresponding to each of the CSI measurement subframe sets.

19. The method according to claim 18, wherein the CSI reports are periodically transmitted via a Physical Uplink Control Channel (PUCCH).

20. The method according to claim 18, wherein the CSI reports are aperiodically transmitted via a Physical Uplink Shared Channel (PUSCH).

* * * * *